(12) United States Patent
Dave et al.

(10) Patent No.: US 9,025,651 B1
(45) Date of Patent: May 5, 2015

(54) SIMPLIFIED POLARIZATION MODE DISPERSION EQUALIZATION

(71) Applicant: ViaSat, Inc., Carlsbad, CA (US)

(72) Inventors: Sameep Dave, Hinckley, OH (US); Fan Mo, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 137 days.

(21) Appl. No.: 13/835,092

(22) Filed: Mar. 15, 2013

Related U.S. Application Data

(60) Provisional application No. 61/755,901, filed on Jan. 23, 2013.

(51) Int. Cl.
*H04B 1/38* (2006.01)
*H04B 10/2569* (2013.01)
*H04B 10/69* (2013.01)

(52) U.S. Cl.
CPC ........ *H04B 10/2569* (2013.01); *H04B 10/6971* (2013.01)

(58) Field of Classification Search
CPC .................. H04B 10/2569; H04B 10/6971
See application file for complete search history.

(56) References Cited

U.S. PATENT DOCUMENTS

| | | | |
|---|---|---|---|
| 2009/0129787 A1* | 5/2009 | Li et al. | 398/208 |
| 2010/0014873 A1* | 1/2010 | Bulow | 398/159 |
| 2010/0142952 A1* | 6/2010 | Qian et al. | 398/65 |
| 2012/0189319 A1* | 7/2012 | Mo et al. | 398/152 |
| 2014/0023133 A1* | 1/2014 | Foggi et al. | 375/232 |
| 2014/0211838 A1* | 7/2014 | Yu et al. | 375/233 |

* cited by examiner

*Primary Examiner* — Shuwang Liu
*Assistant Examiner* — Ross Varndell
(74) *Attorney, Agent, or Firm* — Holland & Hart LLP

(57) ABSTRACT

Methods, systems, and devices are described for equalizing data from an optical signal. Samples are filtered with at least one filter to compensate for polarization mode dispersion in an optical path. The filtered samples may be used to determine errors based on a difference between a radius of a recovered symbol and a target radius. A parameter may be assigned to one or more of the errors and properties of the at least one filter may be updated based on the assigned parameters. The parameter may be assigned from a small set of parameters based on at least one threshold value. Outputs generated from the filtered samples may also be assigned a parameter from a different set of parameters. The parameter assigned to the output may be used to update the particular set of taps of the at least one filter from which the output was generated.

22 Claims, 18 Drawing Sheets

SIMPLIFIED POLARIZATION MODE DISPERSION EQUALIZATION

CROSS REFERENCES

This application for patent claims priority benefit of U.S. provisional patent application Ser. No. 61/755,901 to Dave et al., entitled "Simplified Polarization Mode Dispersion Equalization," filed Jan. 23, 2013, the disclosure of which is incorporated herein in its entirety for all purposes.

BACKGROUND

The present disclosure relates to systems and methods digital modulation and demodulation of data in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at 10 or 40 Gigabit-per-second. Each fiber can carry multiple independent channels, each using a different wavelength of light in a technique known as wavelength-division multiplexing or WDM, thereby enhancing the net data rate of an optical fiber.

As more capacity is continually desired for networks, a demand for increased data transmission rates exists. However, in fiber optic systems, as data rates increase various optical phenomena begin to manifest and act to limit data transmission rates. For example, polarization mode dispersion (PMD) may result in different polarizations traveling at different speeds in an optical fiber. Unless properly compensated, PMD may limit the rate at which data may be transmitted over the optical fiber.

SUMMARY

Methods, systems, and devices are described for equalizing data from an optical signal.

In a first set of embodiments, a method for equalizing data from an optical signal includes filtering samples with at least one filter to compensate for polarization mode dispersion in an optical path. Errors are determined from the filtered samples based on a difference between a radius of a recovered symbol and a target radius. A parameter is assigned to one or more of the errors and the at least one filter is updated based on the parameters assigned to the one or more errors.

In a second set of embodiments, a system for equalizing data from an optical signal includes means for filtering samples with at least one filter to compensate for polarization mode dispersion in an optical path, means for determining errors from the filtered samples based on a difference between a radius of a recovered symbol and a target radius, means for assigning a parameter to one or more of the errors, and means for updating the at least one filter based on the parameters assigned to the one or more errors.

In a third set of embodiments, a receive device includes a filter module and an update module. The filter module includes at least one filter that is configured to filter samples to compensate for polarization mode dispersion in an optical path. The update module is configured to determine errors from the filtered samples based on a difference between a radius of a recovered symbol and a target radius, to assign a parameter to one or more of the errors, and to update the at least one filter in the filter module based on the parameters assigned to the one or more errors.

In a fourth set of embodiments, a receiver module includes a first hardware partition including a first set of filters and a second hardware partition including a second set of filters. The first set of filters is configured to filter samples to compensate for polarization mode dispersion in an optical path and the second set of filters being is configured to filter the same samples to compensate for polarization mode dispersion in the optical path. Each of the hardware partitions is configured to determine errors from the filtered samples based on a difference between a radius of a recovered symbol and a target radius, assign a parameter to one or more of the errors, and update the corresponding set of filters based on the parameters assigned to the one or more errors.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for equalizing data from an optical signal. Samples are filtered with at least one filter to compensate for polarization mode dispersion (PMD) in an optical path. The filtered samples may be used to determine errors based on a difference between a radius of a recovered symbol and a target radius. A parameter may be assigned to one or more of the errors and those parameters may then be used to update or adjust properties of the at least one filter. A parameter assigned to an error may be assigned from a small set of parameters based on at least one threshold value. Outputs generated from the filtered samples may also be assigned a parameter. The parameter assigned to the output may be assigned from a different set of parameters. The parameter assigned to the output may be used to update the particular set of taps of the at least one filter from which the output was generated.

Compensating for PMD may involve the use of a complex and power-hungry receiver design. PMD is a type of distortion phenomena in which two different polarizations travel at different speeds in an optical fiber because of imperfections and asymmetries in the optical fiber. As a result, in-phase (I) and quadrature (Q) information from both polarizations tends to mix together during transmission the receiver uses equalization operations to compensate for the effects of this mixing. Moreover, unlike chromatic dispersion, which is typically a static or slow-changing phenomenon, PMD changes quickly as a result of environmental and/or operating conditions. Adaptive time-domain filtering may be used as part of the equalization operations to effectively keep up with changes in PMD. Simplifying the PMD equalization operations may provide reductions in complexity and power requirements in a receiver design.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with reference to certain embodiments may be combined in various other embodiments. It should also be appreciated that the following systems, methods, devices, and software may individually or collectively be components of a larger system, wherein other procedures may take precedence over or otherwise modify their application.

Figure 1:
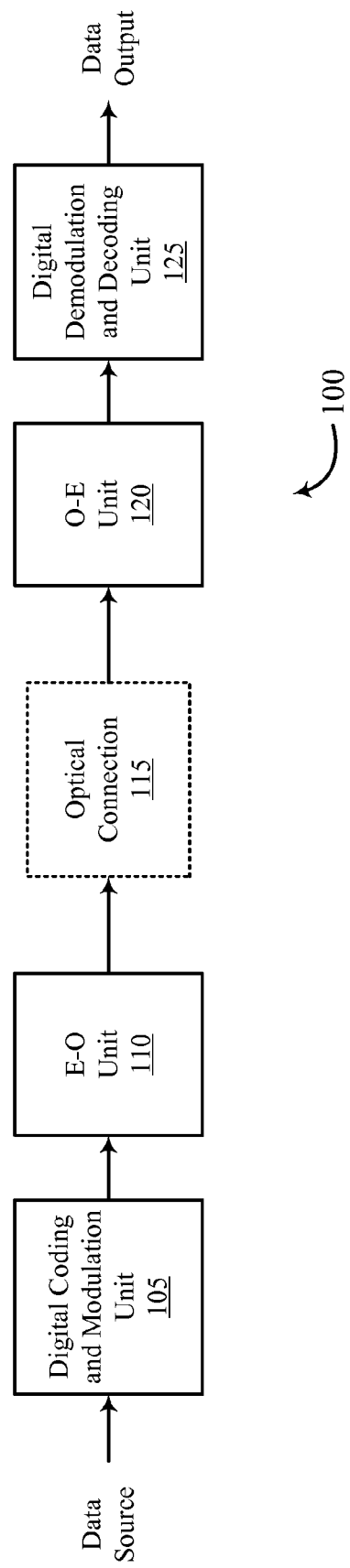
FIG. 1 is a block diagram of an example of an optical communication system including components configured according to various embodiments of the principles described herein.

Systems, devices, methods, and software are described for an optical communication system that uses fiber optic cables as a data transmission medium or path. An example of an optical data transport system 100 is illustrated in FIG. 1. In the present example, the optical data transport system 100 includes a digital coding and modulation unit 105, an electrical-to-optical (E-O) unit 110, an optical connection 115, an optical-to-electrical (O-E) unit 120, and a digital demodulation and decoding unit 125. Each of these components may be in communication, directly or indirectly.

In one embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. In some instances, the transmission data rate across the optical data transport system 100 may be 40 Gbps or higher. For example, the transmission data rate may be 100 Gbps or as high as 200 Gbps.

The digital coding and modulation unit 105 receives this data, and performs framing, forward error correction coding, and modulation functions on the data. These functions may include using a Quadrature Phase-Shift Keying (QPSK) modulation scheme or a 16 Quadrature Amplitude Modulation (16-QAM) modulation scheme, These functions may include multiplexing two differently polarized QPSK signals or two differently polarized 16-QAM signals as part of dual polarization QPSK (DP-QPSK) and DP 16-QAM modulation schemes, respectively. The electrical-to-optical (E-O) unit 110 transforms the data into optical signals, and transmits optical signals containing the data via an optical connection 115. In some embodiments, the optical signal produced by the E-O unit 110 may be coherently transmitted to the optical connection 115 by using one or more lasers (not shown), one or more optical components (not shown), and/or one or more electro-optic devices (not shown). The optical connection 115 may include well known components of such connections, including a fiber optic cable. In some embodiments, the optical connection 115 may include any type of medium or path that enables optical signals, or like signals, to propagate. The optical connection 115 may introduce several optical phenomena that may cause phase and/or amplitude distortion.

An optical-to-electrical (O-E) unit 120 receives the optical signal from the optical connection 115, and transforms the data into the electrical domain. In some embodiments, the optical signal received by the E-O unit 120 may be coherently received from the optical connection 115 by using one or more lasers (not shown), one or more optical components (not shown), and/or one or more electro-optic devices (not shown). The digital demodulation and decoding unit 125 receives the digitized version of the optical signal and performs demodulation, forward error correction decoding, and de-framing functions on the data from the optical signal. The digital demodulation and decoding unit 125 may then output the data (e.g., to a user telecommunications device, a cable operator head-end unit, a telecommunications provider central office, a computer server, or a network attached storage system).

The functions of the digital demodulation and decoding unit 125 may include data equalization for PMD compensation. For example, one or more filters (e.g., adaptive time-domain filters) may be used to filter samples to compensate for PMD resulting from an optical path. The filters (not shown) may include finite impulse response (FIR) filters that may be dynamically updated to keep up with changes in PMD. For example, the FIR filters may be adjustable or tunable through the use of changeable filter tap coefficients. The digital demodulation and decoding unit 125 may determine errors from the filtered samples based on a difference between a generated radius of a recovered symbol and a target radius of an expected symbol. Instead of using the errors directly to update the filters, a simplified approach may be used in which a parameter is assigned to one or more of the errors and the filters are updated based on the assigned parameters. Similarly, a parameter may be assigned to outputs from the filters and the filters may also be updated based on the parameters assigned to the outputs. PMD compensation may also be simplified by using fewer hardware partitions for data equalization, which may reduce the time (e.g., clock cycles) it takes for the filters to be updated.

High-speed digital demodulation and decoding units 125 may typically operate at an analog-to-digital converter (ADC) sample rate of at least twice the symbol rate of the optical signal to achieve acceptable performance levels. However, by including pulse-shaping filters in the digital coding and modulation unit 105 and the digital demodulation and decoding unit 125, at least a portion of the functionality of the digital demodulation and decoding unit 125 may be performed using a sampling rate that is closer to the symbol rate of the optical signal, thereby reducing the complexity and power consumption of the digital demodulation and decoding unit 125. Additionally, by using pulse-shaping filters and DACs during modulation, pre-compensation of non-ideal transmission conditions in the optical connection 115 may be performed by circuitry in the digital coding and modulation unit 105. Similarly, by using ADCs and pulse-shaping filters during demodulation, post-compensation of non-ideal transmission conditions in the optical connection 115 may be performed by circuitry in the digital demodulation and decoding unit 125.

Figure 2:
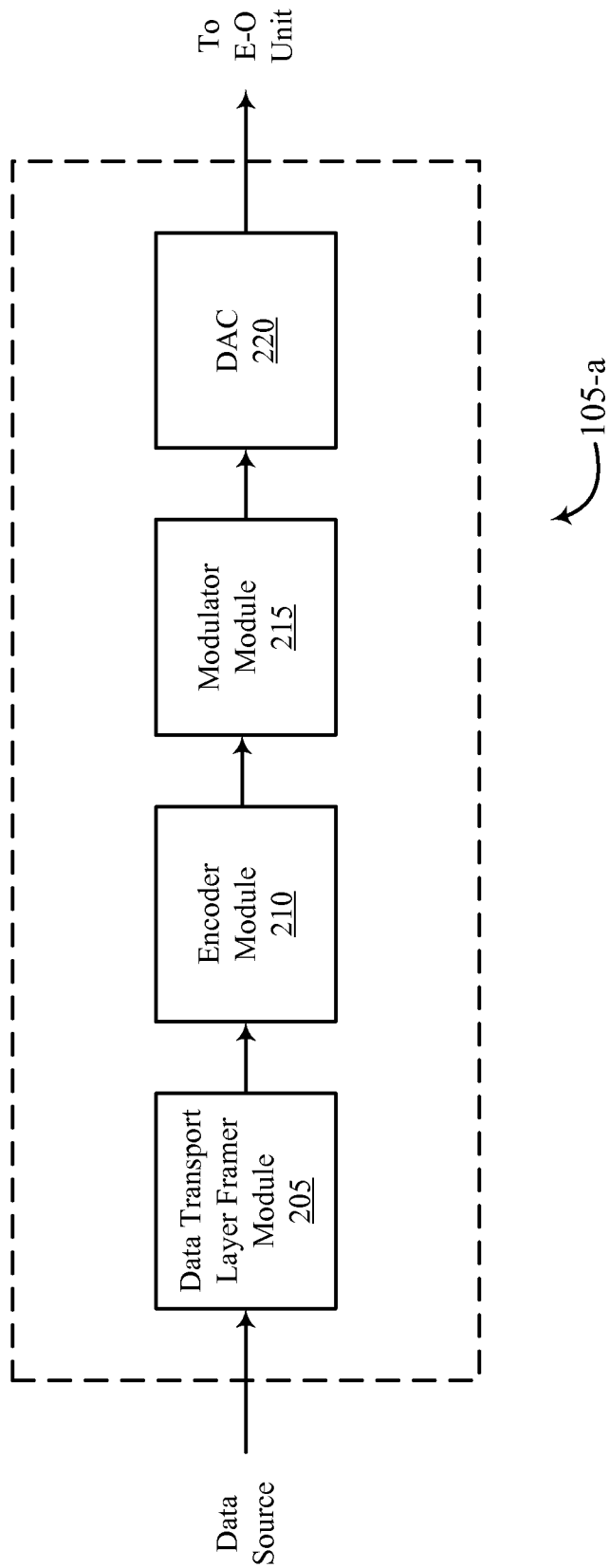
FIG. 2 is a block diagram of an example of a digital coding and modulation module according to various embodiments of the principles described herein.

FIG. 2 illustrates a digital coding and modulation unit 105-*a*. The digital coding and modulation unit 105-*a* may be an example of the digital coding and modulation unit 105 described above with reference to FIG. 1. In the illustrated embodiment, the digital coding and modulation unit 105-*a* includes a data transport layer framer module 205, an encoder module 210, a modulator module 215, and a DAC 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a cyclic redundancy check (CRC). As is well understood, the header may be interleaved with the payload during transmission, depending upon the particular protocol being used for optical transmission.

The encoder module 210 may calculate and add forward error correction (FEC) information to the frames of data received from the data transport layer framer module 205. The particular type of FEC information of various embodiments may generally include systematically generated redundant error-correcting code (ECC) data that is transmitted along with the frames.

The modulator module 215 may perform pulse-shaping and pre-compensation filtering on the frames and FEC information, and modulate the frames and FEC information onto one or more sinusoidal waves generated in the digital domain, and forward the data to the DAC 220. The modulator module 215 may use a QPSK or a DP-QPSK modulation scheme, for example. The modulator module 215 may use a 16-QAM or a DP 16-QAM modulation scheme, for example. The DAC 220 may convert the digital signal of the modulated data into an analog signal, which may be forwarded to an E-O unit (e.g., E-O unit 110) for conversion from the electrical domain to the optical domain.

Figure 3:
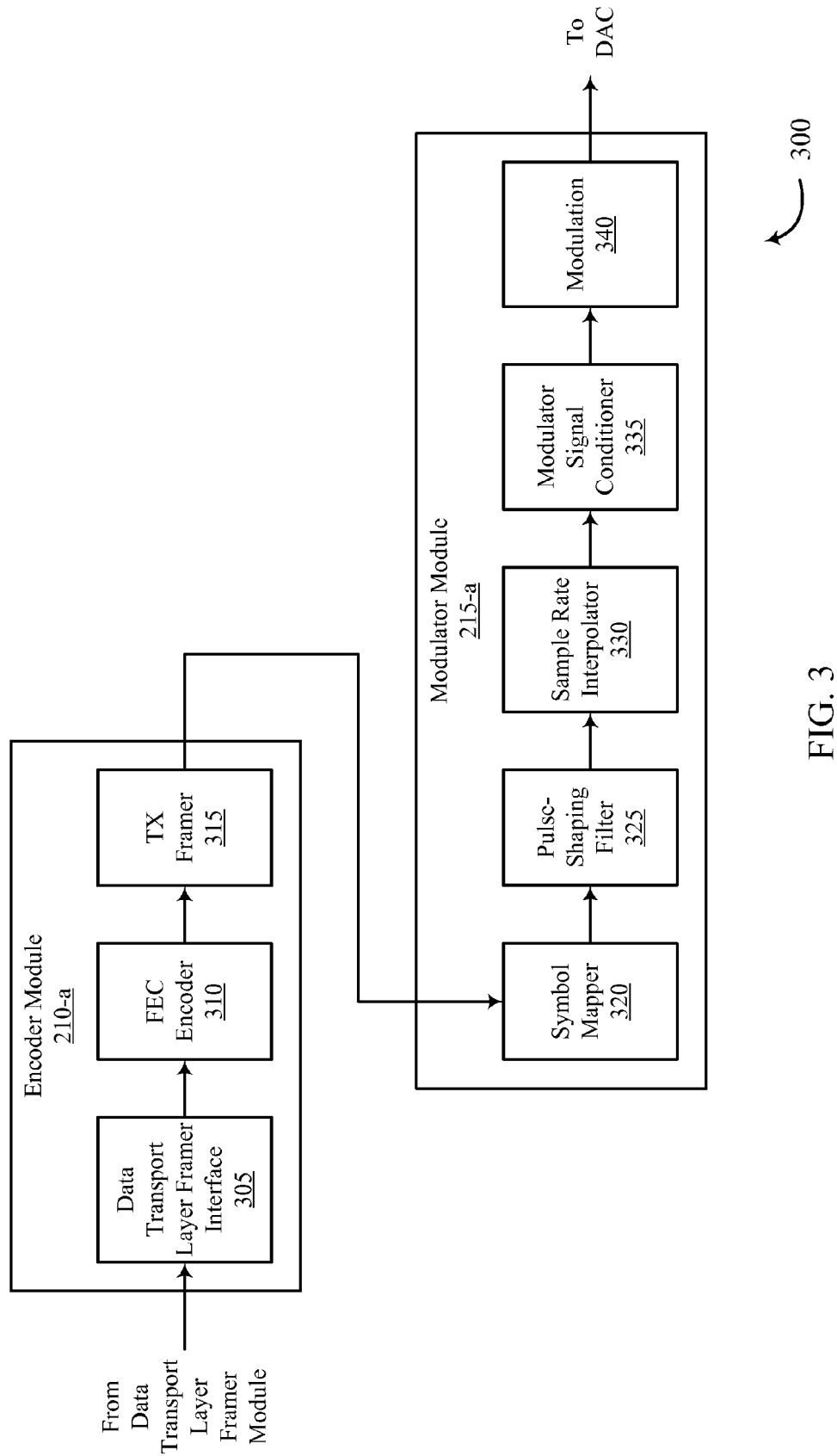
FIG. 3 is a block diagram of an example of an encoder and a modulator in a digital coding and modulation module according to various embodiments of the principles described herein.

FIG. 3 illustrates a system 300 that includes an encoder module 210-*a* and a modulator module 215-*a*. Each of these components may be in communication, directly or indirectly. The encoder module 210-*a* and the modulator module 215-*a* may be examples, respectively, of the encoder module 210 and the modulator module 215 described above with reference to FIG. 2.

As shown in FIG. 3, the encoder module 210-*a* includes a data transport layer framer interface module 305, an FEC encoder module 310, and a transmission (TX) framer module 315. The data transport layer framer interface module 305 may receive data to be transmitted from an application or other process external to the encoder 210-*a*. The data received from the data transport layer may be framed as one or more streams of serial bits for transmission.

The data transport layer framer interface module 305 may forward the data for transmission to the FEC encoder module 310. The FEC encoder module 310 may perform forward error correction on the data to be transmitted. The FEC encoder module 310 may support one or more types of forward error correction techniques. For example, the FEC encoder module 310 may support Turbo Product Code (TPC) encoding, which may be used to increase data reliability and reduce the overall bandwidth for transmission of the data. Another type of forward error correction is Low-Density Parity Check (LDPC), which is based on a linear error correction code. The transmission framer module 315 may receive the FEC encoded bits and frame the bits for symbol mapping at the modulator 215-*a*.

The modulator module 215-*a* may include a symbol mapper module 320, a pulse-shaping filter module 325, a sample rate interpolator module 330, a modulator signal conditioner module 335, and a modulation module 340. Each of these components may be in communication, directly or indirectly.

The symbol mapper module 320 may receive the framed, encoded bits from the transmission framer 315 of the encoder and map the bits to modulation symbols according to a particular modulation scheme. In certain examples, the symbol mapper module 320 may use a QPSK or a DP-QPSK modulation scheme. In certain examples, the symbol mapper module 320 may use a 16-QAM or a DP 16-QAM modulation scheme.

The symbol-mapped bits may then be received at the pulse-shaping filter module 325 in multiples streams. At the pulse-shaping filter module 325, each of the streams may be filtered in the digital domain with at least one pulse-shaping filter. The at least one pulse-shaping filter may include an FIR filter or an infinite impulse response (IIR) filter with adjustable tap coefficients. The at least one pulse-shaping filter may be, for example, a root-raised cosine filter or other known pulse-shaping filter that may reduce or adjust the bandwidth associated with the streams symbol-mapped bits. Additionally or alternatively, each stream of symbol-mapped bits may be filtered using an adjustable time and/or frequency domain filter.

Additionally, the pulse-shaping filter module 325 may filter each stream of symbol-mapped bits to pre-compensate for at least one known or predicted non-ideal transmission condition. The non-ideal transmission condition may occur in the optical space, such as chromatic dispersion and/or timing skew that occurs when an optical signal is transmitted through an optical fiber or other optical medium or path. Additionally or alternatively, the non-ideal transmission condition may occur in the electrical domain. For example, the non-ideal transmission condition may include a non-linear amplifier response at the transmitting or receiving end, or component or channel roll-off that occurs in a DAC, an ADC, or another electrical component.

In certain examples, the non-ideal transmission condition may be predicted or determined based on measurements taken at one or more points in the transmitter, the signal path, or the receiver. For example, a receiver may measure a certain degree of chromatic dispersion in a received optical signal and communicate with the transmitter to provide data about the measured chromatic dispersion. Additionally or alternatively, the non-ideal transmission condition may be modeled or estimated based on known properties of electrical and/or optical components in the signal path between the transmitter and the receiver.

The pulse-shaping filter module 325 may pre-compensate for the at least one identified non-ideal transmission condition by calculating or estimating an effect of the non-ideal transmission condition on the transmitted optical signal and filtering the streams of symbol-mapped bits to at least partially reverse, lessen, or compensate the effect of the non-ideal transmission condition(s). In certain examples, separate filters may be used to create the root-raised cosine pulse shape and to pre-compensate for non-ideal transmission conditions. Alternatively, a single digital filter may be used for each stream to both shape the pulses into the desired root-raised cosine shape and to make further adjustments to the shape of the pulses to pre-compensate for the non-ideal transmission conditions.

The pulse-shaping filter(s) of the pulse-shaping filter module 325 may be dynamically tunable through the use of changeable filter tap coefficients. In certain examples, the type of filter itself may be dynamically changed to pre-compensate for a non-ideal transmission condition. For example, one or more filters in the pulse-shaping filter module 325 may be dynamically changed from a root-raised cosine filter to a simple raised-cosine filter, a Gaussian filter, or a sinc-shaped filter if such a change would more effectively pre-compensate for a known or predicted non-ideal transmission condition.

Additionally, in certain examples it may be possible to dynamically customize the filtering performed at each stream of symbol-mapped bits. For example, when the symbol mapper module 320 produces HI, HQ, VI, and VQ streams, it may be determined that an optical transmission path introduces a timing skew between the HI and HQ streams, but not between the VI and VQ streams. In this example, the properties of a pulse-shaping filter associated with the HI and/or HQ streams may be adjusted to pre-compensate for the timing skew without making adjustments to the VI and VQ streams.

The output of the pulse-shaping filter module 325 may be received at the sample rate interpolator module 330. The sample rate interpolator module 330 may add bits to each of the streams of symbol-mapped bits to increase the sample rate of each stream, for example, to twice the symbol rate. The modulator signal conditioner module 335 may receive the output of the sample rate interpolator module 330 and may perform additional filtering on each of the streams in the digital domain. For example, the modulator signal conditioner module 335 may perform direct current (DC) bias compensation. Additionally or alternatively, the modulator signal conditioner module 335 may filter the streams to compensate for amplitude/amplitude (AM/AM) non-linearity caused by driving amplifiers into saturation and/or amplitude/phase non-linearity. The modulator signal conditioner module 335 may include tunable digital domain filters that may be dynamically adjusted as changes in DC bias or amplifier non-linearity are detected, predicted, or determined. In some embodiments, some or all of the functionality of the modulator signal conditioner module 335 is performed at the phase-shaping filter module 325.

The output of the modulator signal conditioner module 335 may be received by the modulation module 340. The modulation module 340 may generate sinusoidal waves or waveforms in the digital domain and modulate the filtered, upsampled, and conditioned symbol-mapped bits that are output by the modulator signal conditioner module 335 onto the sinusoidal waveforms. In certain examples, the sinusoidal waveforms may have a relatively low intermediate frequency.

The modulated waves may be output by the modulation module 340 to one or more DACs (not shown), which may convert each modulated carrier wave from the digital domain to the analog domain. The waveforms in the analog domain that are output by the DAC(s) may undergo amplification and additional conditioning. When H and V polarizations are used, the amplified and conditioned waveforms may be converted into separate H and V optical signals at an E-O unit (not shown).

Figure 4:
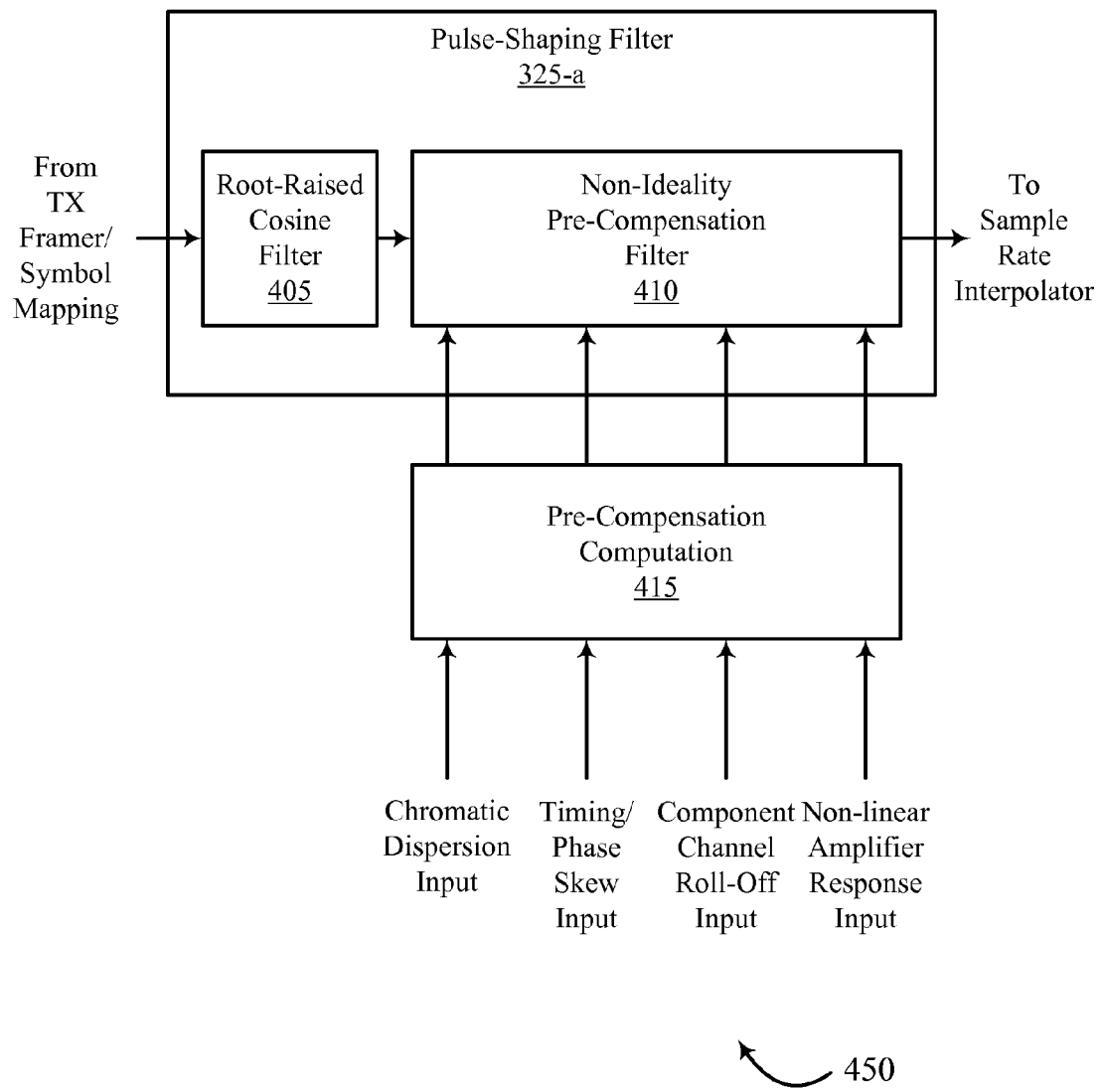
FIG. 4 is block diagram of an example of a pulse-shaping filter module according to various embodiments of the principles described herein.

FIG. 4, a system 450 is shown in which a pulse-shaping filter module 325-a is coupled to a pre-compensation computation module 415. The pulse-shaping filter module 325-a may be an example of the pulse-shaping filter module 325 described above with reference to FIG. 3.

The pulse-shaping filter module 325-a may include a root-raised cosine filter module 405 and a non-ideality pre-compensation filter module 410. The root-raised cosine filter module 405 may filter incoming streams of symbol-mapped bits (e.g., pulses of high and low voltages) to form the bits into a root-raised cosine shape. This root-raised cosine filter module 405 may reduce the bandwidth of the streams, thereby reducing inter-symbol interference. Additionally or alternatively, other types of pulse-shaping filters may be used, including, but not limited to, boxcar filters, sinc filters, raised-cosine filters, Gaussian filters, and the like.

The non-ideality pre-compensation filter module 410 may filter the streams of symbol-mapped bits in the digital domain to compensate for one or more predicted, determined, or known non-ideal transmission conditions. The non-ideality pre-compensation filter module 410 may receive input regarding chromatic dispersion in the signal path, input regarding timing phase or skew occurring in the signal path, input regarding component channel roll-off in the transmitter or receiver, and input regarding non-linear amplifier response in either the transmitter or the receiver. In other embodiments, input regarding more or fewer non-ideal transmission conditions may be received at the non-ideality pre-compensation filter module 410.

The input received by non-ideality pre-compensation filter module 410 may be used to generate a filtering function in the digital domain which is substantially inverse to a measured, a determined, or a predicted effect of the non-ideal transmission condition(s) to mitigate the detrimental effects of the identified non-ideal transmission conditions. In certain examples, the substantially inverse filtering functions may be pre-programmed or retrievable in memory. Additionally or alternatively, the input may include filter tap coefficients that weight certain aspects of one or more pulse-shaping filters to pre-compensate for the identified non-ideal transmission condition(s). The input may be received directly from an external application or process or statically stored in a register. In certain examples, the input may include active feedback and/or measurements received by one or more components within the signal path of the optical signal. For example, a first device may transmit an optical signal to a second device, and the second device may measure one or more non-ideal transmission conditions based on the received optical signal and transmit the measurements or other feedback based on the measurements back to the first device.

In certain examples, the root-raised cosine filter module 405 and the non-ideality pre-compensation filter module 410 may be implemented by a single discrete filter for each stream of symbol-mapped bits. Alternatively, the symbol-mapped bits may be sequentially filtered by a root-raised cosine filter and a non-ideality pre-compensation filter. In certain examples, the order in which each stream undergoes root-raised cosine filtering and non-ideality pre-compensation filtering may vary. In certain examples, the order of filtering may be dynamically modified to achieve a most favorable result. Moreover, in certain examples, a first stream (e.g., HI stream) of symbol-mapped bits may be passed through root-raised cosine filtering and non-ideality pre-compensation filtering in a different order than a second stream (e.g., VQ stream) of symbol-mapped bits.

The pre-compensation computation module 415 may receive input from an external application, process, or device and/or from one or more registers storing saved or default input regarding non-ideal transmission conditions. The input may be used by the pre-compensation computation module 415 to compute a set of filter tap coefficient values for a discrete pulse-shaping filter implementing at least the non-ideality pre-compensation filter module 410. In certain examples, the pre-compensation computation module 415 may compute the filter tap coefficient values based on a weighted consideration of the totality of the received input. Additionally or alternatively, the pre-compensation computation module 415 may compute the filter tap coefficient values based on a one-to-one correlation between non-ideal transmission conditions and filter tap coefficient values.

Figure 5:
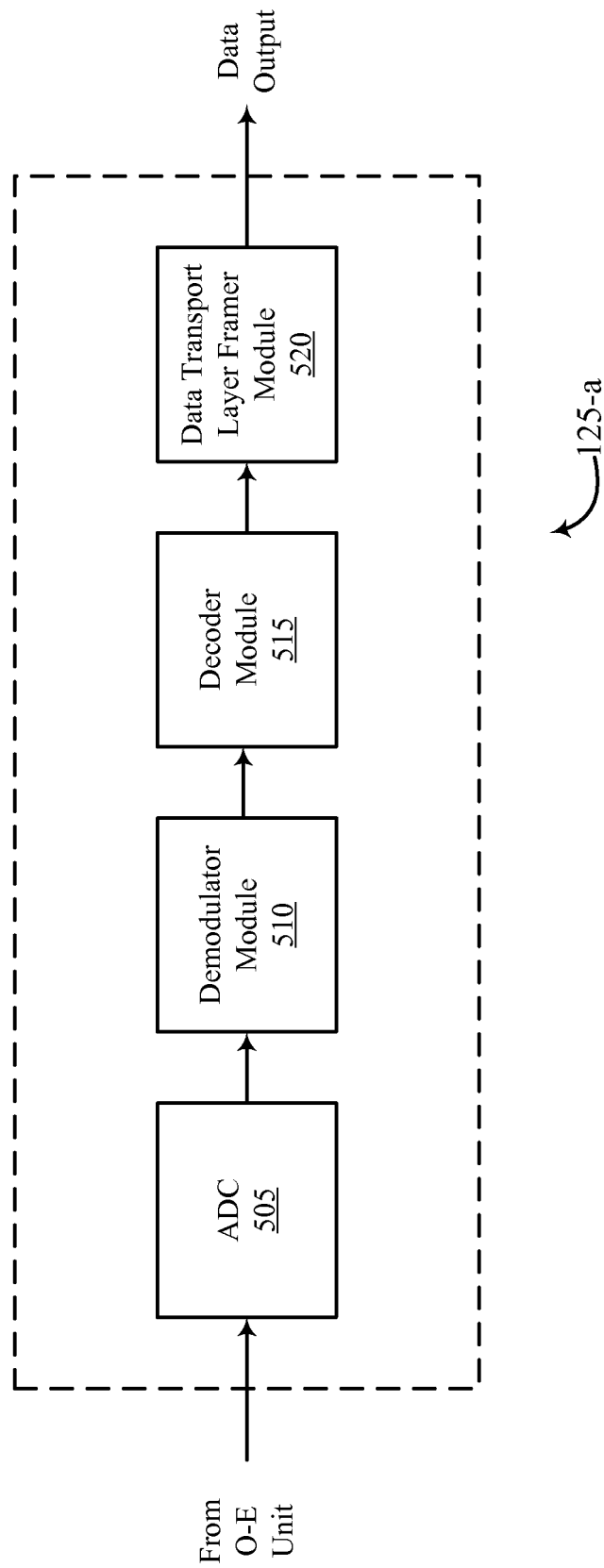
FIG. 5 is a block diagram of an example of a digital demodulation and decoding module according to various embodiments of the principles described herein.

As illustrated in FIG. 5, an example of a digital demodulation and decoding unit 125-a is shown. The digital demodulation and decoding unit 125-a may be an example of the digital demodulation and decoding unit 125 described above with reference to FIG. 1. In this embodiment, the digital demodulation and decoding unit 125-a includes an ADC 505, a demodulator module 510, a decoder module 515, and a data transport layer framer module 520. Each of these components may be in communication, directly or indirectly.

The ADC 505 may sample an electrical and analog version of an optical and analog signal received by an O-E unit (not shown). The optical signal from the E-O unit may have been transmitted at a data transmission rate of 40 Gbps or 100 Gbps, for example. Moreover, the optical signal may have been coherently transmitted to include phase information. The ADC 505 may provide a digitally sampled version of the optical/analog signal to the demodulator module 510, which demodulates the digitally-sampled signal and provides the demodulated data to the decoder module 515. The demodulator module 510 may also compensate for non-ideal transmission conditions.

The demodulator module 510 may perform data equalization for PMD compensation. For example, one or more filters (e.g., adaptive time-domain filters) may be used to filter samples to compensate for PMD. The filters (not shown) may include FIR filters that are adjustable or tunable through the use of changeable filter tap coefficients. The demodulator module 510 may determine errors from the filtered samples based on a difference between a generated radius of a recovered symbol and a target radius of an expected symbol. A simplified approach may be used in which a parameter is assigned to one or more of the errors and the filters are updated based on the assigned parameters. Similarly, a parameter may be assigned to outputs from the filters and the filters may also be updated based on the parameters assigned to the outputs.

PMD compensation may also be simplified by using fewer hardware partitions for data equalization, which may reduce the time (e.g., clock cycles) it takes for the filters to be updated. In some embodiments, the demodulator module 510 includes one hardware partition (not shown) that is used to filter I/Q samples of both horizontal and vertical polarizations to produce filtered I/Q samples of horizontal polarization, and another hardware partition (not shown) that is used to filter the same I/Q samples of both horizontal and vertical polarizations to produce filtered I/Q samples of vertical polarization.

The decoder module 515 performs FEC decoding on the demodulated data, and may correct transmission errors identified from error-correcting code. The decoder module 515 provides the decoded and corrected data to the data transport layer framer module 520, which frames (or de-frames) the data from the signal according to the particular protocol used in the optical transmission, and provides output data. The data may be output to, for example, a user or any receiving system.

Figure 6:
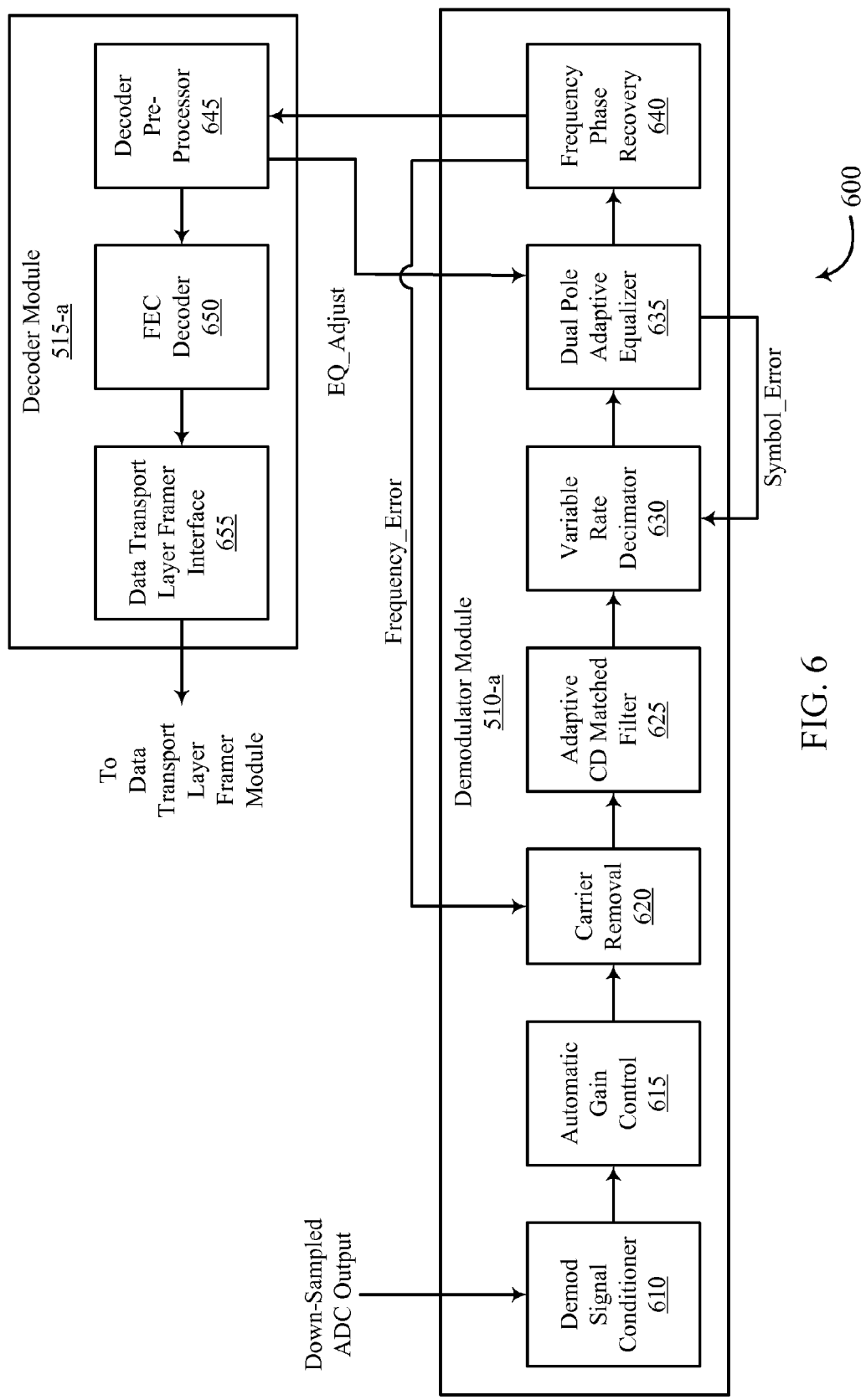
FIG. 6 is a block diagram of an example of a demodulator and a decoder according to various embodiments of the principles described herein.

FIG. 6 is a block diagram of a system 600 that includes a demodulator module 510-a and a decoder module 515-a. Each of these components may be in communication, directly or indirectly. The demodulator module 510-a and the decoder module 515-a may be respective examples of the demodulator module 510 and the decoder module 515 described above with reference to FIG. 5.

The demodulator 510-a may include a demodulator signal conditioner module 610, an automatic gain control module 615, a carrier removal module 620, an adaptive chromatic dispersion (CD) matched filter module 625, a variable rate decimator 630, a dual pole adaptive equalizer module 635, and a frequency phase recovery module 640.

Through the use of pulse-shaping to reduce inter-symbol interference and the effects of non-ideal transmission conditions, it may be possible to perform some of the filtering and other preliminary demodulation steps on a version of the optical signal that is sampled at or near the baud rate (e.g., the symbol rate) of the optical signal. However, an ADC that samples the optical signal at a rate of twice the symbol rate may be more readily obtainable and less expensive than an ADC that samples at or near the baud rate of the optical signal. Therefore, in some embodiments, an ADC that samples at twice the symbol rate may be used, and the output of the ADC may be down-sampled to just over the baud rate of the optical signal (e.g., between 1.0 and 1.3 times the baud rate).

The demodulator signal conditioner module 610 may receive the down-sampled version from the ADC and perform preliminary filtering on the received sampled version of the optical signal. The automatic gain control module 615 may automatically adjust the gain of the down-sampled version of the optical signal to bring the amplitude of the modulated carrier wave into an acceptable range. The carrier removal module 620 may then extract the symbol-mapped bits from the carrier frequency according to the modulation scheme used in the optical signal.

The adaptive CD matched filter 625 may filter the symbol-mapped bits to compensate for chromatic dispersion in the optical transmission path. In certain examples, the adaptive CD matched filter 625 may match one or more filters in the modulator of the device transmitting the optical signals. The variable rate decimator module 630 may adjust the sampling rate of the symbol-mapped bits such that each stream of symbol-mapped bits is at a sampling rate that will allow for minimal inter-symbol interference during equalization. In certain cases, the variable rate decimator module 630 may up-sample the extracted and filtered symbol-mapped bits to the original sample rate of the ADC (e.g., twice the symbol rate). The dual pole adaptive equalizer module 635 performs additional filtering on the streams of symbol-mapped bits in the digital domain to reduce inter-symbol interference and allow for the recovery of the modulated data. The dual pole adaptive equalizer module 635 may perform an inverse or matched filtering function of one or more pulse-shaping filters in the transmitter. The dual pole adaptive equalizer module 635 may be configured to support one or more polarizations in the modulation scheme.

The dual pole adaptive equalizer module 635 may perform data equalization for PMD compensation. For example, one or more filters (e.g., adaptive time-domain filters) may be used to filter samples to compensate for PMD. The filters (not shown) may include FIR filters that are adjustable or tunable through the use of changeable filter tap coefficients. The dual pole adaptive equalizer module 635 may determine errors from the filtered samples based on a difference between a generated radius of a recovered symbol and a target radius of an expected symbol. A simplified approach may be used in which a parameter is assigned to one or more of the errors and the filters are updated based on the assigned parameters. Similarly, a parameter may be assigned to outputs from the filters and the filters may also be updated based on the parameters assigned to the outputs.

PMD compensation may also be simplified by using fewer hardware partitions for data equalization, which may reduce the time (e.g., clock cycles) it takes for the filters to be updated. In some embodiments, the dual pole adaptive equalizer module 635 includes one hardware partition (not shown) that is used to filter I/Q samples of both horizontal and vertical polarizations to produce filtered I/Q samples of horizontal polarization, and another hardware partition (not shown) that is used to filter the same I/Q samples of both horizontal and vertical polarizations to produce filtered I/Q samples of vertical polarization. A hardware partition may refer to a block or module that is separated from another block or module through a flip-flop (FF) or some other like device. For example, a hardware partition may include one or more FFs to receive data and/or one or more FFs to output data. By using fewer hardware partitions, the delays (e.g., clock cycles) that result from the input and output FFs may be reduced and filter updates may be done more quickly.

After equalization is performed, the frequency phase recovery module 640 may recover the encoded bits based on symbols representing changes in the phase of the modulated carrier frequency. The encoded bits may be recovered from the symbols using information about the constellation diagram that is representative of the modulation scheme used to transmit the optical signal. In some embodiments, additional or separate modules may be used as appropriate to demodulate the encoded data from the recovered symbols.

The decoder module 515-a of the present example includes a decoder pre-processor module 645, an FEC decoder module 650, and a data transport layer framer interface module 655. Each of these components may be in communication, directly or indirectly.

The decoder pre-processor module 645 may enforce a set of rules to ensure the integrity and validity of the encoded data received from the demodulator module 510-a. The FEC decoder module 650 may perform forward error correction on the encoded bits to identify and correct errors and reconstruct the originally transmitted stream of data. The FEC decoder module 650 may support one or more decoding techniques such as TPC decoding and LDPC decoding, for example. The data transport layer framer interface 655 may forward the originally transmitted stream of data to a data transport layer framer for processing and delivery.

Figure 7:
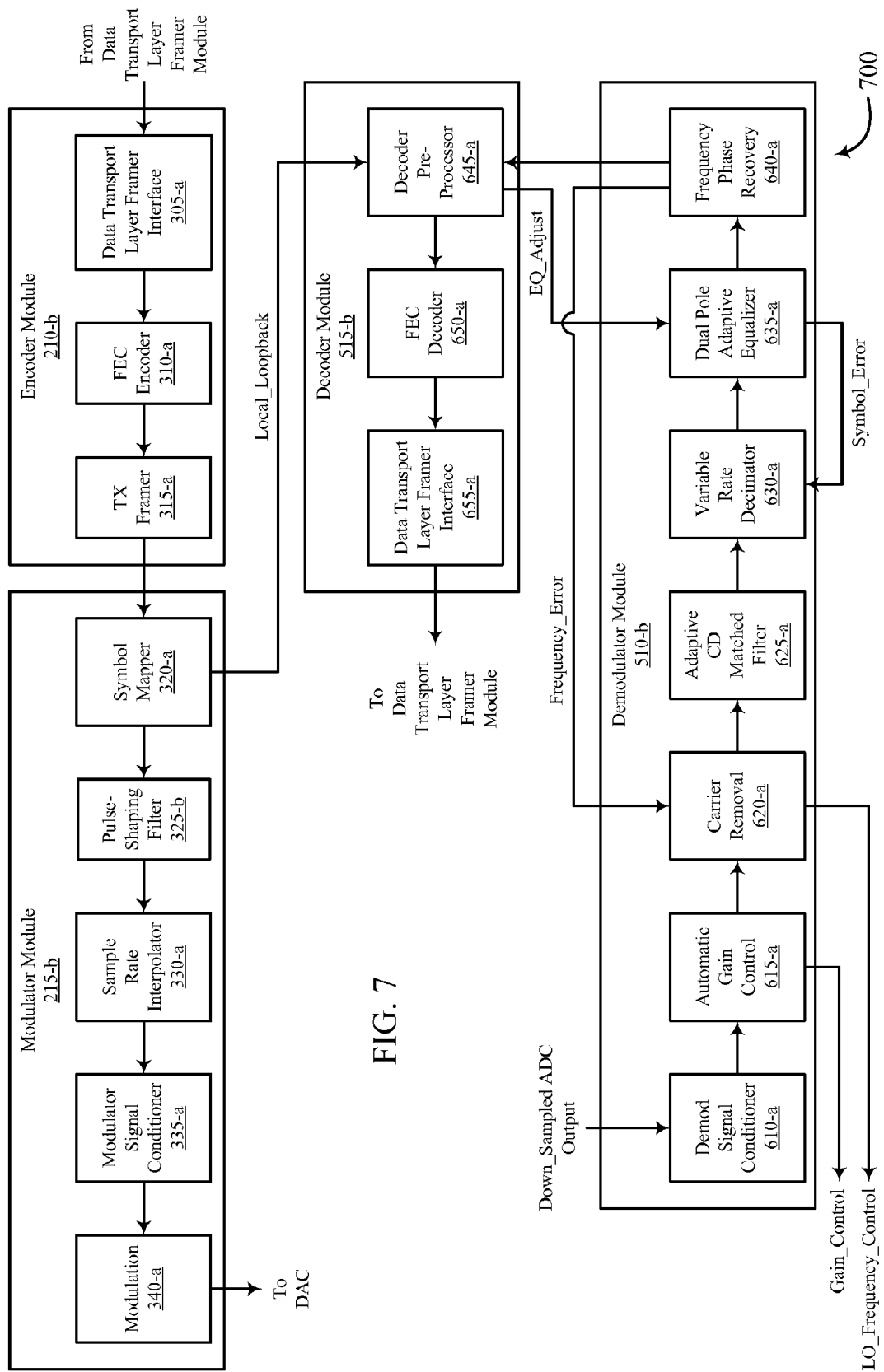
FIG. 7 is a block diagram of an example of an optical modem according to various embodiments of the principles described herein.

FIG. 7 illustrates a block diagram of an example of a modem device 700. The modem 700 includes an encoder module 210-b, a modulator module 215-b, a demodulator module 510-b, and a decoder module 515-b. The encoder module 210-b may be an example of the encoder modules 210 and 210-a described above with reference to FIG. 2 and FIG. 3, respectively. The modulator module 215-b may be an example of the modulator modules 215 and 215-a described above with reference to FIG. 2 and FIG. 3, respectively. The demodulator module 510-b may be an example of the demodulator modules 510 and 510-a described above with reference to FIG. 5 and FIG. 6, respectively. The decoder module 515-b may be an example of the decoder modules 515 and 515-a described above with reference to FIG. 5 and FIG. 6, respectively.

The encoder module 210-b may include a data transport layer framer interface module 305-a, an FEC encoder module 310-a, and a TX framer module 315-a. These components may be examples of the data transport layer framer interface module 305, the FEC encoder module 310, and the TX framer module 315 described above with reference to FIG. 3. The modulator module 215-b may include a symbol mapper module 320-a, a pulse-shaping filter module 325-b, a sample rate interpolator module 330-a, a modulator signal conditioner module 335-a, and a modulation module 340-a. These components may be examples of the symbol mapper module 320, the pulse-shaping filter module 325, the sample rate interpolator module 330, the modulator signal conditioner 335, and the modulation module described above with reference to FIG. 3. Additionally, the pulse-shaping filter 325-b may be an example of the pulse-shaping filter 325-a described above with reference to FIG. 4.

The demodulator module 510-b of the example in FIG. 7 may include a demodulator signal conditioner module 610-a, an automatic gain control module 615-a, a carrier removal module 620-a, an adaptive CD matched filter module 625-a, a variable rate decimator module 630-a, a dual pole adaptive equalizer module 635-*a*, and a frequency phase recovery module 640-*a*. These components may be examples of the demodulator signal conditioner module 610, the automatic gain control module 615, the carrier removal module 620, the adaptive CD matched filter module 625, the variable rate decimator module 630, the dual pole adaptive equalizer module 635, and the frequency phase recovery module 640 described above with reference to FIG. 6.

The decoder module 515-*b* may include a decoder pre-processor module 645-*a*, an FEC decoder module 650-*a*, and a data transport layer framer interface 655-*a*. These components may be examples of the decoder pre-processor module 645, the FEC decoder module 650, and the data transport layer framer interface module 655 described above with reference to FIG. 6.

As shown in FIG. 7, components of the modulator module 215-*b*, the decoder module 515-*b*, and the demodulator module 510-*b* may interact with each other. For example, the symbol mapper module 320-*a* of the modulator module 215-*b* may provide local loopback feedback signal (Local Loopback) to the decoder pre-processor module 645-*a* to increase the accuracy of the decoder pre-processor module 645-*a*. The decoder pre-processor module 645-*a* may provide an equalizer adjustment feedback signal (EQ_Adjust) to the dual pole adaptive equalizer 635-*a* of the demodulator 510-*b* to dynamically adjust the equalization filtering at the demodulator module 510-*c*.

The frequency phase recovery module 640-*a* of the demodulator module 510-*b* may provide a frequency error signal (Frequency_Error) to the carrier removal module 620-*a* to allow the carrier removal module 620-*a* to achieve frequency lock with the carrier frequency. The dual pole adaptive equalizer module 635-*a* may provide a symbol error feedback signal (Symbol_Error) to the variable rate decimator module 630-*a* to allow the variable rate decimator module 630-*a* to dynamically adjust the sampling rate and reduce inter-symbol interference. The carrier removal module 620-*a* may provide a local oscillator frequency control signal (LO_Frequency_Control) to correct the frequency of a local oscillator signal that is used to demodulate the received optical signal. Additionally, the automatic gain control 615-*a* may provide a gain control signal (Gain_Control) that is based on the gain being applied to the amplitude of the modulated carrier wave.

Figure 8B:
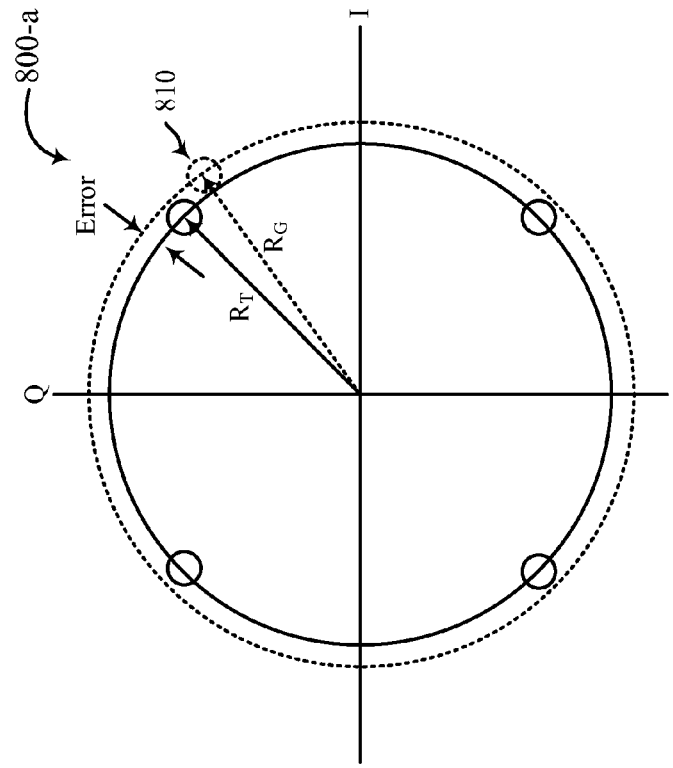
FIG. 8B is a diagram that illustrates an example of an error in a QPSK constellation according to various embodiments of the principles described herein.
Figure 8A:
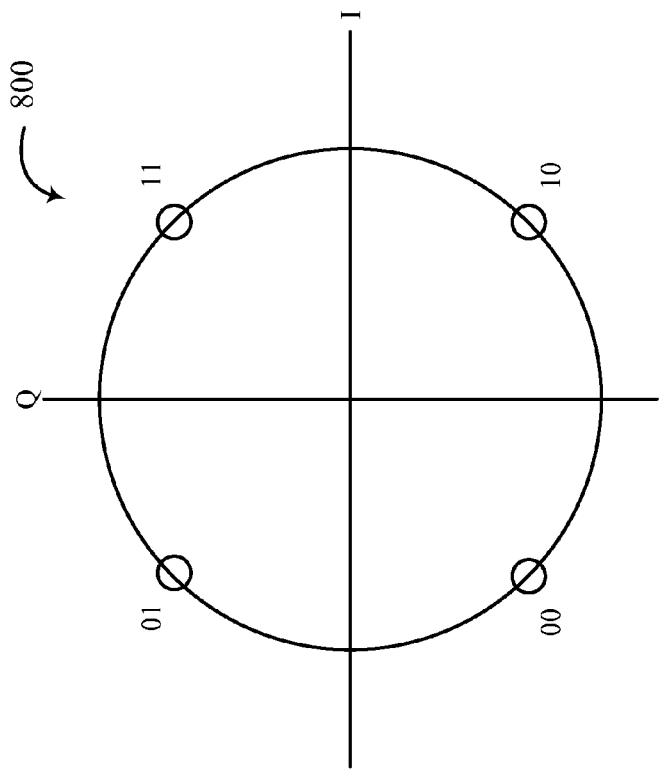
FIG. 8A is a diagram that illustrates an example of a Quadrature Phase-Shift Keying (QPSK) constellation according to various embodiments of the principles described herein.

FIG. 8A illustrates an example of a constellation diagram for a modulation scheme that may be used for optical communications. A constellation diagram 800 represents a typical QPSK or DP-QPSK modulation scheme in which four symbols are equally spaced on a circle that is centered at the origin of a complex plane defined by a quadrature (Q)-axis and an in-phase (I)-axis. There are two bits mapped to each symbol and the symbols are Gray-coded such that only one bit changes between adjacent symbols. The symbols corresponding to the bit pairs (11), (01), (00), and (11) are respectively located on the circle at 45°, 135°, 225°, and 315° relative to the positive I-axis. Each bit pair is therefore located within one of the four quadrants of the complex plane.

FIG. 8B illustrates an example of an error that may occur in QPSK recovered symbols. A constellation diagram 800-*a* is shown that is an example of the constellation diagram 800 of FIG. 8A. A recovered symbol 810 is shown with a generated radius ($R_G$) that defines a circle (dotted line) that is different from the QPSK circle (solid line) defined by a target radius ($R_T$) of expected symbols. The recovered symbol 810 may be an on-time symbol. The error that results between the generated radius and the target radius may be caused by time-changing impairments produced in an optical path (e.g., optical connection 115), including PMD. For modulation schemes that use multiple polarizations (e.g., DP-QPSK, DP 16-QAM), the square of the generated radius (i.e., energy) of fully-recovered on-time symbols is typically equal for each of the symbols in the constellation diagram and equal to the square of the target or constant radius (i.e., energy) of the expected symbols. Therefore, an error between the generated radius and the target radius may require an update to the equalization operations (e.g., filtering) that mitigate the time-changing impairments to correct for the error.

One approach that may simplify the use errors to update equalization operations is to assign a parameter to the error instead of using the magnitude and/or sign of the error. Different examples of error parameter assignment using multiple threshold values are illustrated below in FIG. 8C, FIG. 8D, FIG. 8E, and FIG. 8F.

Figure 8D:
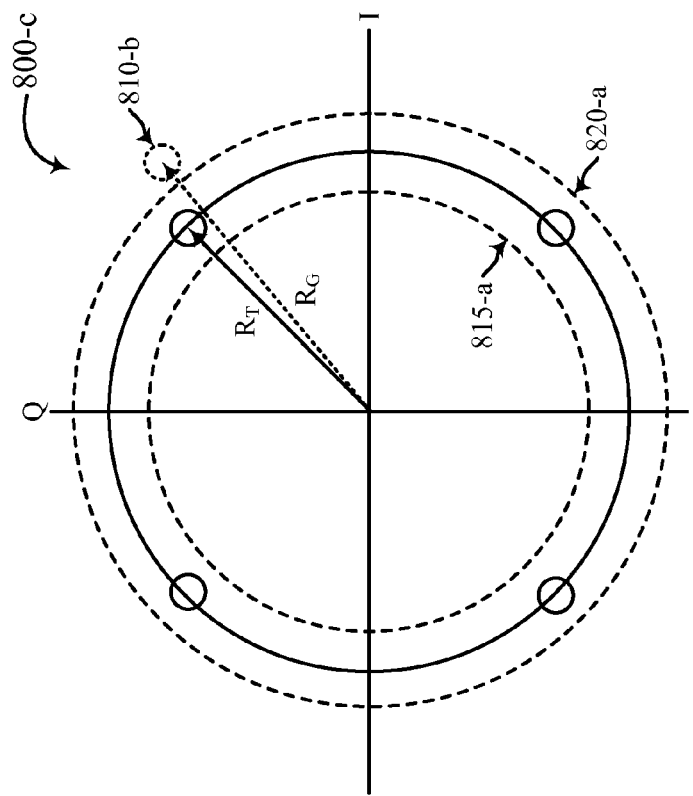
FIG. 8D is a diagram that illustrates another example of error parameter assignment using thresholds for a QPSK constellation according to various embodiments of the principles described herein.
Figure 8C:
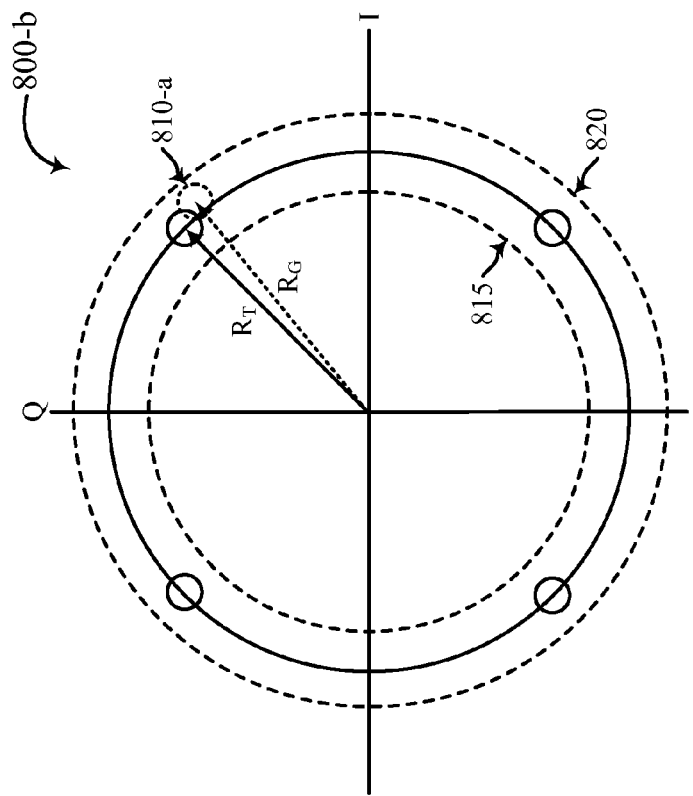
FIG. 8C is a diagram that illustrates an example of error parameter assignment using thresholds for a QPSK constellation according to various embodiments of the principles described herein.

FIG. 8C illustrates an example of error parameter assignment using two threshold values for a QPSK constellation. A constellation diagram 800-*b* is shown that is an example of the constellation diagram 800 of FIG. 8A. Because a recovered symbol 810-*a* is offset from its corresponding QPSK symbol an error occurs between a generated radius ($R_G$) of the recovered symbol 810-*a* and a target radius ($R_T$) of the expected symbols. A first threshold value 815 and a second threshold value 820 are also shown to illustrate how a parameter may be assigned to the error of the recovered symbol 810-*a*. In some embodiments, the first threshold value 815 and the second threshold value 820 represent a guardband about the QPSK circle (solid line) defined by the target radius of the expected symbols.

When the recovered symbol 810-*a* is within the two threshold values, the error may be small and a first parameter may be assigned to the error. The first parameter may indicate that little if any adjustment is needed to the equalization operations. When the recovered symbol 810-*a* is outside the second threshold value 820, then the error may be sufficiently large and a second parameter may be assigned to the error. The second parameter may indicate that some adjustment is needed to the equalization operations to reduce the generated radius and bring the recovered symbols closer to the target radius. Moreover, when the recovered symbol 810-*a* is within the first threshold value 815, the error may also be sufficiently large and a third parameter may be assigned to the error. The third parameter may indicate that some adjustment is needed to the equalization operations to increase the generated radius and bring the recovered symbols closer to the target radius. In some embodiments, the first parameter may be "0", the second parameter may be "−1", and the third parameter may be "+1". That is, a signed bit may be used to represent the different values that the first parameter, the second parameter, and the third parameter may take.

In this example, the recovered symbol 810-*a* is within the two threshold values and the first parameter is assigned to the error. Because the recovered symbol 810-*a* is close to its expected location in the constellation diagram 800-*b*, no adjustment is needed to the equalization operations and the assignment of the first parameter reflects that.

FIG. 8D illustrates another example of error parameter assignment using two threshold values for a QPSK constellation. A constellation diagram 800-*c* is shown that is an example of the constellation diagram 800 of FIG. 8A. Because a recovered symbol 810-*b* is offset from its corresponding QPSK symbol an error occurs between the generated radius ($R_G$) of the recovered symbol 810-*b* and a target radius ($R_T$) of the expected symbols. A first threshold value 815-*a* and a second threshold value 820-*a* are also shown to illustrate how a parameter may be assigned to the error of the recovered symbol 810-*b*. The first threshold value 815-*a* and the second threshold value 820-*a* may be examples of the first threshold value 815 and the second threshold value 820 of FIG. 8C.

When the recovered symbol 810-*b* is within the two threshold values, the error may be small and a first parameter may be assigned to the error. When the recovered symbol 810-*b* is outside the second threshold value 820-*a*, then the error may be sufficiently large and a second parameter may be assigned to the error. Moreover, when the recovered symbol 810-*b* is within the first threshold value 815-*a*, the error may also be sufficiently large and a third parameter may be assigned to the error. In some embodiments, the first parameter may be "0", the second parameter may be "−1", and the third parameter may be "+1". That is, a signed bit may be used to represent the different values that the first parameter, the second parameter, and the third parameter may take.

In this example, the recovered symbol 810-*b* is outside the second threshold value 820-*a* and the second parameter is assigned to the error. The second parameter may indicate that some adjustment is needed to the equalization operations to reduce the generated radius and bring the recovered symbols closer to the target radius.

Figure 8F:
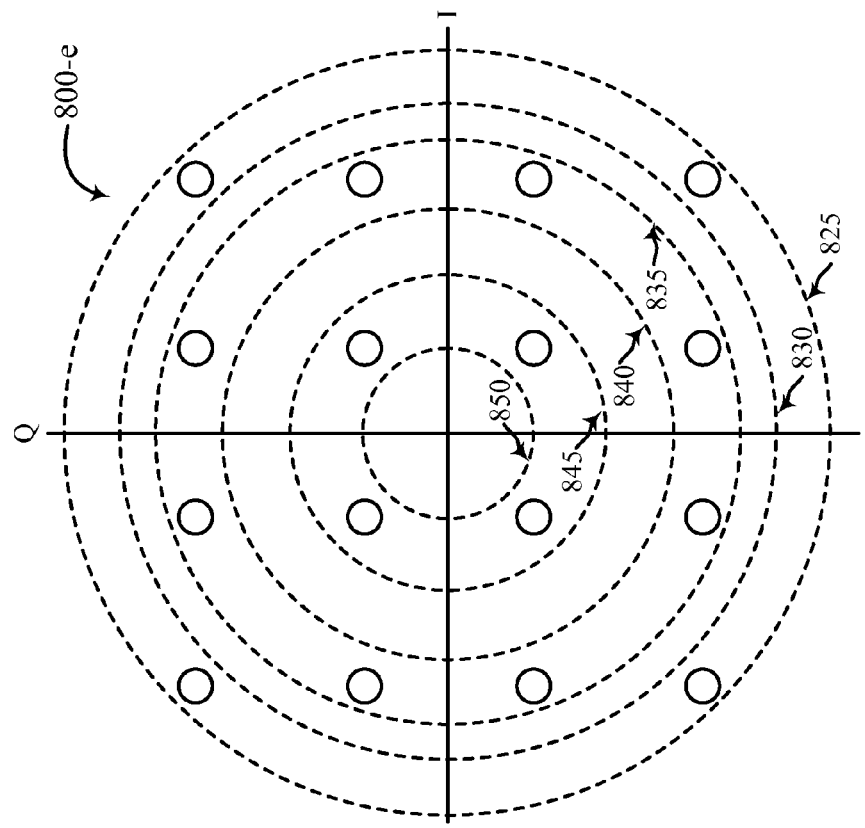
FIG. 8F is a diagram that illustrates an example of error parameter assignment using multiple thresholds for a 16 Quadrature Amplitude Modulation constellation according to various embodiments of the principles described herein.
Figure 8E:
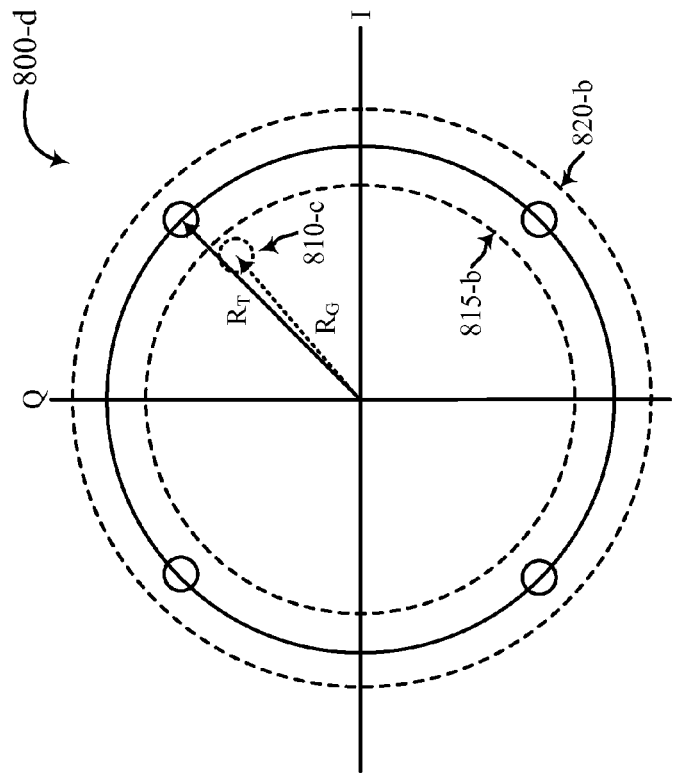
FIG. 8E is a diagram that illustrates yet another example of error parameter assignment using thresholds for a QPSK constellation according to various embodiments of the principles described herein.

FIG. 8E illustrates yet another example of error parameter assignment using two threshold values for a QPSK constellation. A constellation diagram 800-*d* is shown that is an example of the constellation diagram 800 of FIG. 8A. Because a recovered symbol 810-*c* is offset from its corresponding QPSK symbol an error occurs between the generated radius ($R_G$) of the recovered symbol 810-*b* and a target radius ($R_T$) of the expected symbols. A first threshold value 815-*b* and a second threshold value 820-*b* are shown to illustrate how a parameter may be assigned to the error of the recovered symbol 810-*c*. The first threshold value 815-*b* and the second threshold value 820-*b* may be examples of the first threshold values 815 and 815-*a*, and the second threshold values 820 and 820-*a* of FIG. 8C and FIG. 8D, respectively. The first threshold value 815-*b* and the second threshold value 820-*b* may be used in a manner similar to that described above with reference to FIG. 8C and FIG. 8D.

In this example, the recovered symbol 810-*c* is within the first threshold value 815-*b* and a parameter is assigned to the error to indicate that some adjustment is needed to the equalization operations to increase the generated radius and bring the recovered symbols closer to the target radius.

The threshold values of FIG. 8C, FIG. 8D, and FIG. 8E may be illustrative representations on the complex plane of the constellation diagrams 800-*b*, 800-*c*, and 800-*d* of other values (e.g., energy values) used for error parameter assignment. In other words, an error (or its energy) may be compared to threshold values that are different from the threshold values illustrated in FIG. 8C, FIG. 8D, or FIG. 8E when determining which parameter to assign to the error.

FIG. 8F illustrates an example of using multiple threshold values for a higher-order modulation constellations. A constellation diagram 800-*e* represents a typical 16-QAM or DP 16-QAM modulation scheme in which sixteen symbols are equally spaced and centered at the origin of the complex plane defined by the Q-axis and the I-axis. Also shown are threshold values 825, 830, 835, 840, 845, and 850. These threshold values may be used to assign a parameter to an error of a recovered symbol for 16-QAM or DP 16-QAM. Fewer or more threshold values may be used than the number shown in FIG. 8F. Moreover, the spacing between the different threshold values need not be the same. As described with reference to FIG. 8C, FIG. 8D, and FIG. 8E above, the parameter that is assigned to the error indicates whether an adjustment is needed to the equalization operations and the type of adjustment that is needed. In addition, the threshold values of FIG. 8F may be illustrative representations on the complex plane of the constellation diagram 800-*e* of other values (e.g., energy values) used for error parameter assignment. In other words, an error (or its energy) may be compared to threshold values that are different from the threshold values illustrated in FIG. 8F when determining which parameter to assign to the error.

Figure 9:
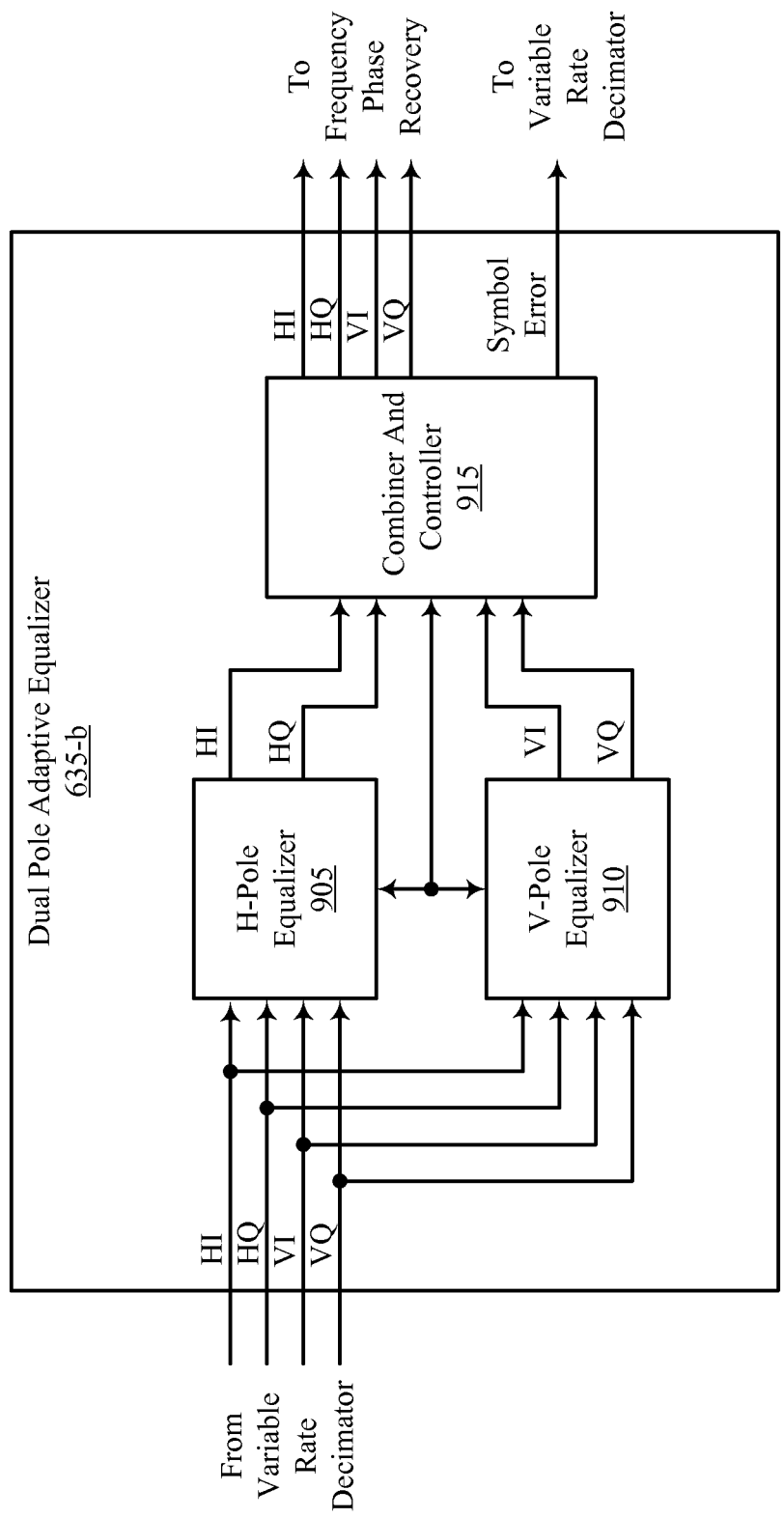
FIG. 9 is a diagram that illustrates an example of a dual pole adaptive equalizer according to various embodiments of the principles described herein.

FIG. 9 illustrates a dual pole adaptive equalizer 635-*b* that is an example of the dual pole adaptive equalizers 635 and 635-*a* of FIG. 6 and FIG. 7, respectively. The dual pole adaptive equalizer 635-*b* includes a horizontal polarization (H-pole) equalizer 905, a vertical polarization (V-pole) equalizer 910, and a combiner and controller 915. Each of these components may be in communication, directly or indirectly.

The dual pole adaptive equalizer 635-*b* may receive streams of HI, HQ, VI, and VQ samples at a rate of one (on-time) sample-per-symbol (sample/symbol) instead of 2 or 1.5 samples/symbol. This lower rate enables some of the simplifications in the design and operation of the dual pole adaptive equalizer 635-*b*. The lower sample rate may be obtained by discarding or disregarding off-time samples, for example. The streams of HI, HQ, VI, and VQ are a combination of the transmitted HI, HQ, VI, and VQ streams as a result of optical phenomena during transmission (e.g., PMD). The dual pole adaptive equalizer 635-*b* de-couples the received HI, HQ, VI, and VQ streams to recover better estimates of the HI, HQ, VI, and VQ streams that were transmitted.

The H-pole equalizer 905 receives HI, HQ, VI, and VQ streams, and produces de-coupled HI and HQ streams. The H-pole equalizer 905 uses one or more complex FIR filters to perform adaptive time-domain filtering to equalize the input streams. The H-pole equalizer 905 may adjust the taps of the complex FIR filters using a simplified sign-based block constant modulus algorithm (SS-BCMA), for example. The H-pole equalizer 905 may be implemented as a separate hardware partition within the dual pole adaptive equalizer 635-*b*.

In SS-BCMA, errors may be determined from the filtered samples based on a difference between a generated radius of a recovered symbol and a target radius of expected symbols, a parameter is assigned to one or more of the errors, and one or more of the complex FIR filters is updated based on the parameters assigned to the errors. In some embodiments, the SS-BCMA may assign a parameter to an output from the filtered samples, where that parameter is different from the parameter assigned to the errors. The parameter assigned to the output may be used to update a particular set of complex FIR filter taps that correspond to the output. In some embodiments, the parameter assigned to one of the one or more errors indicates a positive sign, a negative sign, or a zero based on at least one threshold value or guardband. For example, a parameter is assigned to an error to indicate a positive sign when the error is smaller than a first threshold value or the parameter is assigned a negative sign when the error is greater than a second threshold value larger than the first threshold value. In another example, a parameter is assigned to an error to indicate a zero when the error is greater than a first threshold and smaller than a second threshold value larger than the first threshold value. For quaternary or higher-order modulation schemes (e.g., 16-QAM), a parameter is assign to an error based on the location of the error relative to two or more threshold values.

The V-pole equalizer 910 receives the same HI, HQ, VI, and VQ streams as the H-pole equalizer 905, and produces de-coupled VI and VQ streams. The V-pole equalizer 910 also uses one or more complex FIR filters to perform adaptive time-domain filtering to equalize the input streams. The V-pole equalizer 910 may adjust the taps of the complex FIR filters using SS-BCMA, for example. The V-pole equalizer 910 may be implemented as a separate hardware partition within the dual pole adaptive equalizer 635-b.

The combiner and controller 915 may receive de-coupled streams from the H-pole equalizer 905 and the V-pole equalizer 910, and may output the de-coupled HI, HQ, VI, and VQ streams for carrier recovery operations such as frequency and phase recovery. The output of the combiner and controller 915 may have a sample rate of one (on-time) sample/symbol. In some embodiments, the combiner and controller 915 may provide an output at a sampling rate higher than one sample/symbol by including off-time samples (e.g., 1.5 samples/symbol). In such embodiments, the combiner and controller 915 may include one or more complex FIR filters to perform adaptive time-domain filtering to equalize streams with off-time samples.

The combiner and controller 915 may also reset, synchronize, and/or adjust some of the operations in the H-pole equalizer 905 and the V-pole equalizer 910. The combiner and controller 915 may generate and provide the symbol error feedback signal (Symbol_Error) described above with reference to FIG. 7 to dynamically adjust the sampling rate and reduce inter-symbol interference.

Figure 10A:
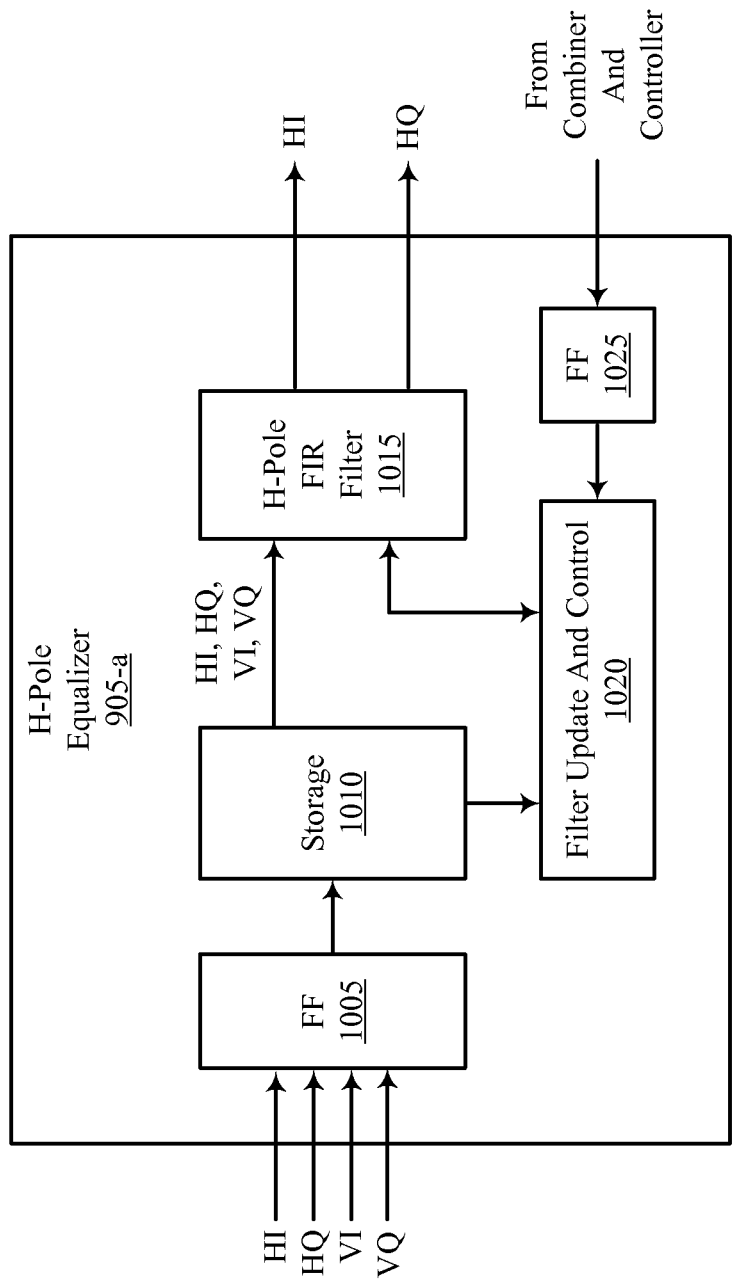
FIG. 10A is block diagram of an example of a horizontal polarization equalizer according to various embodiments of the principles described herein.

FIG. 10A illustrates an H-pole equalizer 905-a that is an example of the H-pole equalizer 905 of FIG. 9. The H-pole equalizer 905-a includes an FF 1005, a storage 1010, an H-pole FIR filter 1015, a filter update and control 1020, and an FF 1025. Each of these components may be in communication, directly or indirectly.

The FF 1005 may receive and store the HI, HQ, VI, and VQ streams, and when clocked, provides those streams to the storage 1010. The storage 1010 may provide samples from the HI, HQ, VI, and VQ streams to the H-pole FIR filter 1015 for adaptive time-domain filtering to produce de-coupled HI and HQ streams. The storage 1010 may also provide the HI, HQ, VI, and VQ samples from the streams to the filter update and control 1020 for dynamic adjustment of the filters in the H-pole FIR filter 1015. The filter update and control 1020 may use the SS-BCMA or similar mechanism to calculate filter taps and adjust the filters in the H-pole FIR filter 1015 with the calculated filter taps. The FF 1025 may receive and store reset, synchronization, and/or adjustment information, and when clocked, may provide that information to the filter update and control 1020. The FF 1005 and/or the FF 1025 enable the H-pole equalizer 905-a to be implemented as a separate hardware partition. By having the adaptive operations to adjust the filters in the H-pole FIR filter 1015 take place within a single hardware partition (e.g., filter update and control 1020), the filter adaptation process may be performed in fewer clock cycles than if the adaptive operations involved going outside of the hardware partition.

Figure 10B:
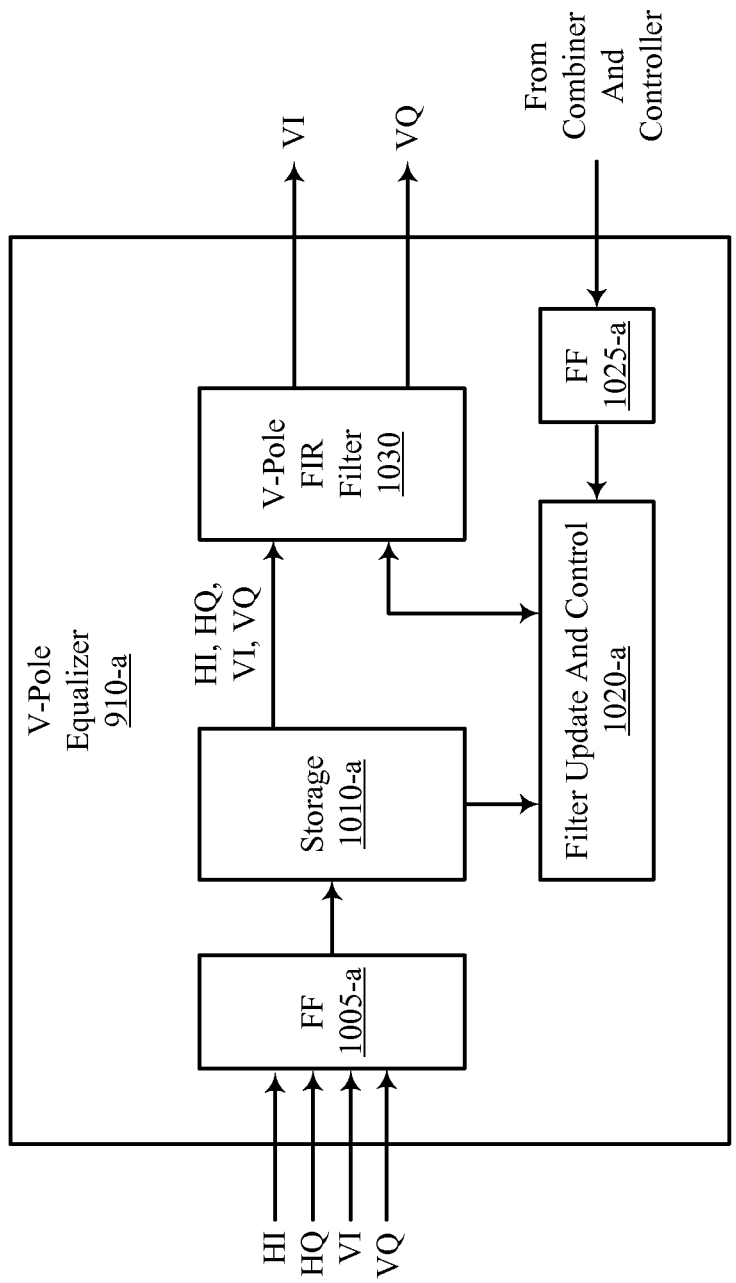
FIG. 10B is block diagram of an example of a vertical polarization equalizer according to various embodiments of the principles described herein.

FIG. 10B illustrates a V-pole equalizer 910-a that is an example of the V-pole equalizer 910 of FIG. 9. The V-pole equalizer 910-a includes an FF 1005-a, a storage 1010-a, a V-pole FIR filter 1030, a filter update and control 1020-a, and an FF 1025-a. The FF 1005-a, the storage 1010-a, the filter update and control 1020-a, and the FF 1025-a may be examples of the FF 1005, the storage 1010, the filter update and control 1020, and the FF 1025 of FIG. 10A, respectively. Each of these components may be in communication, directly or indirectly.

The FF 1005-a may receive and store the HI, HQ, VI, and VQ streams, and when clocked, provides those streams to the storage 1010-a. The storage 1010-a may provide samples from the HI, HQ, VI, and VQ streams to the V-pole FIR filter 1030 for adaptive time-domain filtering to produce de-coupled VI and VQ streams. The storage 1010-a may also provide the HI, HQ, VI, and VQ samples from the streams to the filter update and control 1020-a for dynamic adjustment of the filters in the V-pole FIR filter 1030. The filter update and control 1020-a may use the SS-BCMA or similar mechanism to calculate filter taps and adjust the filters in the V-pole FIR filter 1030 with the calculated filter taps. The FF 1025-a may receive and store reset, synchronization, and/or adjustment information, and when clocked, may provide that information to the filter update and control 1020-a. The FF 1005-a and/or the FF 1025-a enable the V-pole equalizer 910-a to be implemented as a separate hardware partition. By having the adaptive operations to adjust the filters in the V-pole FIR filter 1030 take place within a single hardware partition (e.g., filter update and control 1020-a), the filter adaptation process may be performed in fewer clock cycles than if the adaptive operations involved going outside of the hardware partition.

As noted above, the H-pole equalizer 905-a and the V-pole equalizer 910-a of FIG. 10A and FIG. 10B, respectively, may perform independent adaptive time-domain filtering because of their separate hardware partition implementation. Similarly, the combiner and controller 915 of FIG. 9 may be involved in adaptive time-domain filtering of off-time samples and may also be implemented as an independent hardware partition.

Figure 11A:
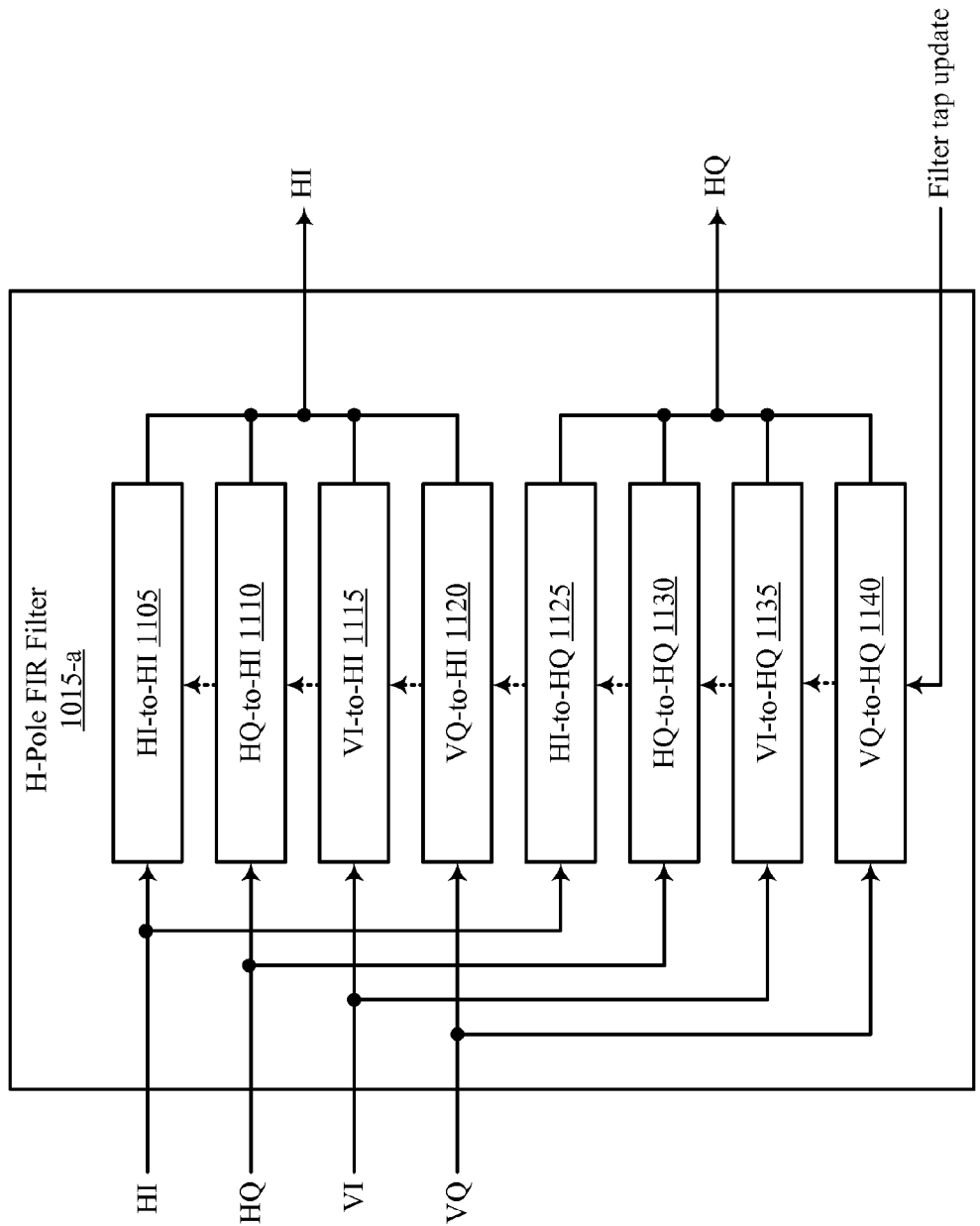
FIG. 11A is block diagram of an example of horizontal polarization adaptive filters according to various embodiments of the principles described herein.

FIG. 11A illustrates an H-pole FIR filter 1015-a that is an example of the H-pole FIR filter 1015 of FIG. 10A. The H-pole FIR filter 1015-a includes multiple filter tap modules to implement adaptive time-domain filtering that produces de-coupled HI and HQ streams. Each filter tap module may correspond to a particular set of taps of one or more complex FIR filters. In this example, the H-pole FIR filter 1015-a includes an HI-to-HI module 1105, an HQ-to-HI module 1110, a VI-to-HI module 1115, a VQ-to-HI module 1120, an HI-to-HQ module 1125, an HQ-to-HQ module 1130, a VI-to-HQ module 1135, and a VQ-to-HQ module 1140. Each of these components may be in communication, directly or indirectly.

The HI-to-HI module 1105 includes the filter taps for HI stream input to HI stream output. The HQ-to-HI module 1110 includes the filter taps for HQ stream input to HI stream output. The VI-to-HI module 1115 includes the filter taps for VI stream input to HI stream output. The VQ-to-HI module 1120 includes the filter taps for VQ stream input to HI stream output. The HI-to-HQ module 1125 includes the filter taps for HI stream input to HQ stream output. The HQ-to-HQ module 1130 includes the filter taps for HQ stream input to HQ stream output. The VI-to-HQ module 1135 includes the filter taps for VI stream input to HQ stream output. The VQ-to-HQ module 1140 includes the filter taps for VQ stream input to HQ stream output.

Each of the modules in the H-pole FIR filter 1015-a may be independently adjusted through a filter tap update signal. In some embodiments, the filter tap update signal is provided by an update and control component such as the filter update and control 1020 described above with reference to FIG. 10A. Because of symmetries, the filter taps of some of the modules are related. For example, the filter taps in the HQ-to-HI module 1110 are negative the filter taps in the HI-to-HQ module 1125, the filter taps in the HI-to-HI module 1105 are the same as the HQ-to-HQ module 1130, the filter taps in the VQ-to-HI module 1120 are negative the filter taps in the VI-to-HQ module 1135, and the filter taps in the VI-to-HI module 1115 are the same as the filter taps in the VQ-to-HQ module 1140. Having related sets of filter taps simplifies the process of tracking and updating the filter taps as part of the adaptive time-domain filtering. These symmetries, however, are the result of using complex filters in the design. The approach described herein may also be applicable to designs based on real filters, but those designs may not have the symmetries described above.

Figure 11B:
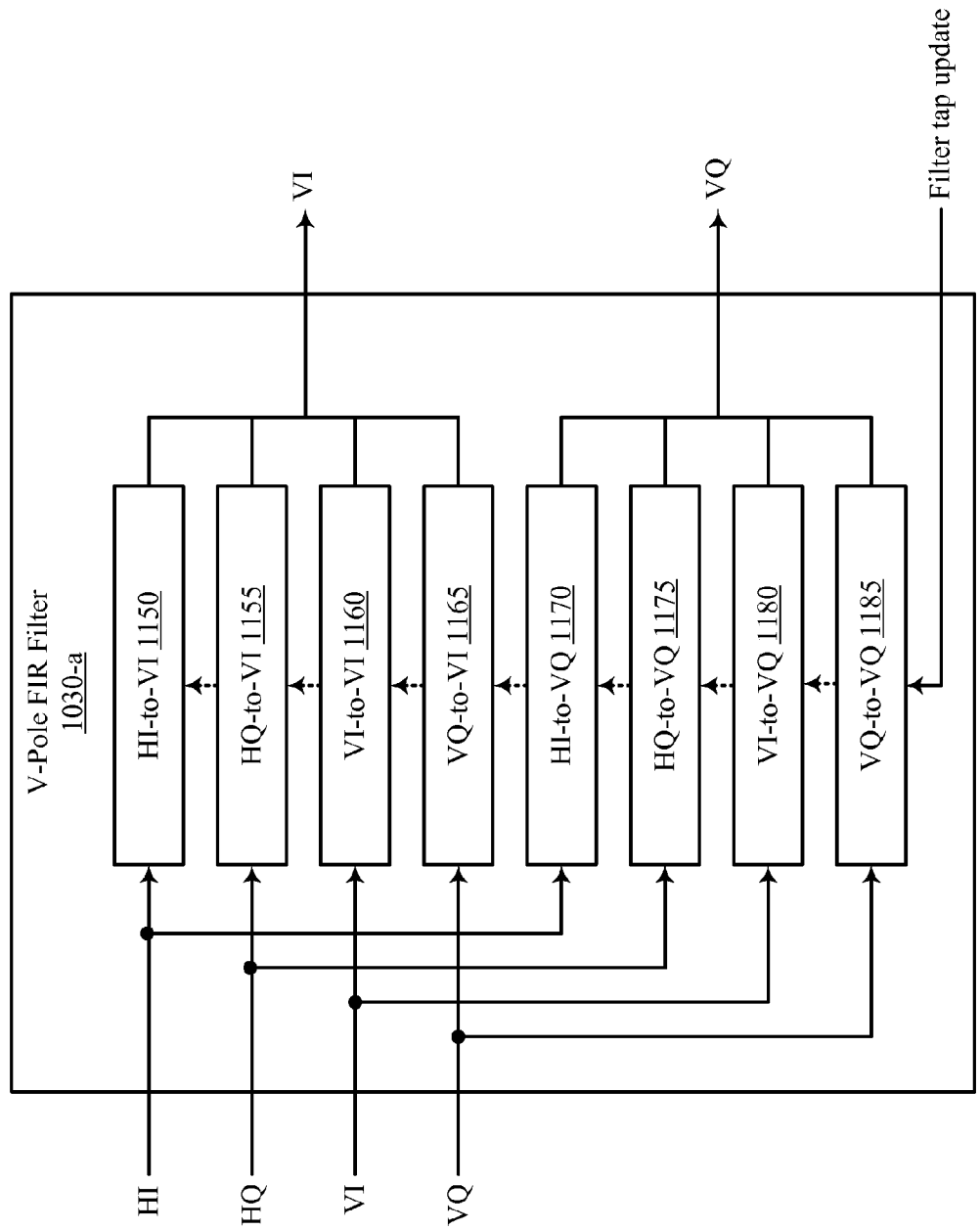
FIG. 11B is block diagram of an example of vertical polarization adaptive filters according to various embodiments of the principles described herein.

FIG. 11B illustrates a V-pole FIR filter 1030-*a* that is an example of the V-pole FIR filter 1030 of FIG. 10B. The V-pole FIR filter 1030-*a* includes multiple filter tap modules to implement adaptive time-domain filtering that produces decoupled VI and VQ streams. Each filter tap module may correspond to a particular set of taps of one or more complex FIR filters. In this example, the V-pole FIR filter 1030-*a* includes an HI-to-VI module 1150, an HQ-to-VI module 1155, a VI-to-VI module 1160, a VQ-to-VI module 1165, an HI-to-VQ module 1170, an HQ-to-VQ module 1175, a VI-to-VQ module 1180, and a VQ-to-VQ module 1185. Each of these components may be in communication, directly or indirectly.

The HI-to-VI module 1150 includes the filter taps for HI stream input to VI stream output. The HQ-to-VI module 1155 includes the filter taps for HQ stream input to VI stream output. The VI-to-VI module 1160 includes the filter taps for VI stream input to VI stream output. The VQ-to-VI module 1165 includes the filter taps for VQ stream input to VI stream output. The HI-to-VQ module 1170 includes the filter taps for HI stream input to VQ stream output. The HQ-to-VQ module 1175 includes the filter taps for HQ stream input to VQ stream output. The VI-to-VQ module 1180 includes the filter taps for VI stream input to VQ stream output. The VQ-to-VQ module 1185 includes the filter taps for VQ stream input to VQ stream output.

Each of the modules in the V-pole FIR filter 1030-*a* may be independently adjusted through a filter tap update signal. In some embodiments, the filter tap update signal is provided by an update and control component such as the filter update and control 1020-*a* described above with reference to FIG. 10B. Because of symmetries, the filter taps of some of the modules are related. For example, the filter taps in the HQ-to-VI module 1155 are negative the filter taps in the HI-to-VQ module 1170, the filter taps in the HI-to-VI module 1150 are the same as the HQ-to-VQ module 1175, the filter taps in the VQ-to-VI module 1165 are negative the filter taps in the VI-to-VQ module 1180, and the filter taps in the VI-to-VI module 1160 are the same as the filter taps in the VQ-to-VQ module 1185. Having related sets of filter taps simplifies the process of tracking and updating the filter taps as part of the adaptive time-domain filtering. As noted above, these symmetries result from using complex filters in the design instead of real filters. Designs based on real filters may not have the symmetries described above.

Adjusting the filter taps of the various modules in the H-pole FIR filter 1015-*a* and in the V-pole FIR filter 1030-*a* may be carried out by using the SS-BCMA or a similar mechanism. Examples of the SS-BCMA calculations used to update filter taps are illustrated below. In a first example, for the HI-to-HI module 1105 of the H-pole FIR filter 1015-*a*, a next or updated set of filter taps may generally be determined by the following expression:

$$HI2HI(t+1)=HI2HI(t)+f(HI_{OUT}^2+HQ_{OUT}^2)\times\text{sign}(HI_{OUT})\times HI_{IN}\times\mu, \quad (1)$$

where HI2HI(t+1) represents the updated set of filter taps, HI2HI(t) represents the current set of filter taps, $(HI_{OUT}^2+HQ_{OUT}^2)$ represents an error term, $HI_{OUT}$ is the current decoupled output, $HI_{IN}$ is the current input to the module, and μ is a scaling or damping factor that is used to control the convergence/tracking speed in relation to equalization stability.

The error term may correspond to the errors described above with reference to FIG. 8B, FIG. 8C, FIG. 8D, FIG. 8E, and FIG. 8F. That is, the error term may correspond to the square of a radius where the square of the I-component of the radius and the square of the Q-component of the radius are added. The function f(.) operating on the error term may be a three-valued function that compares the error term against a first (high) threshold value and a second (low) threshold value. When the error term is greater than or equal to the first (high) threshold value a "−1" is returned by the function f(.), when the error term is smaller than or equal to the second (low) threshold value a "+1" is returned by the function f(.), otherwise the function f(.) returns a "0". In other embodiments, the function f(.) operating on the error term may be a five-valued function or a seven-valued function, for example. The operation of the function f(.) is substantially similar to the assignment of parameters to errors described above with reference to FIG. 8C, FIG. 8D, FIG. 8E, and FIG. 8F. Moreover, the threshold values associated with the function f(.) may correspond to the threshold values described above with reference to FIG. 8C, FIG. 8D, FIG. 8E, and FIG. 8F. The sign(.) function operating on the output $HI_{OUT}$ may be a two-valued function that returns a "+1" when the output is positive and a "−1" when the output is negative. In some embodiments, for higher-order modulation schemes (e.g., 16-QAM) the function f(.) may be M-valued, where M is greater than three. In some embodiments, the sign(.) function may be N-valued, where N is greater than two.

In a second example, for the HQ-to-HI module 1110 of the H-pole FIR filter 1015-*a*, a next or updated set of filter taps may generally be determined by the following expression:

$$HQ2HI(t+1)=HQ2HI(t)+f(HI_{OUT}^2+HQ_{OUT}^2)\times\text{sign}(HI_{OUT})\times HQ_{IN}\times\mu, \quad (2)$$

where HQ2HI(t+1) represents the updated set of filter taps, HQ2HI(t) represents the current set of filter taps, $(HI_{OUT}^2+HQ_{OUT}^2)$ represents an error term, $HI_{OUT}$ is the current decoupled output, $HQ_{IN}$ is the current input to the module, and μ is a scaling or damping factor. The error term, the decoupled output, and the scaling factor for the HQ-to-HI module 1110 in equation (2) are the same as for the HI-to-HI module 1105 in equation (1).

In a third example, for the VI-to-HI module 1115 of the H-pole FIR filter 1015-*a*, a next or updated set of filter taps may generally be determined by the following expression:

$$VI2HI(t+1)=VI2HI(t)+f(HI_{OUT}^2+HQ_{OUT}^2)\times\text{sign}(HI_{OUT})\times VI_{IN}\times\mu, \quad (3)$$

where VI2HI(t+1) represents the updated set of filter taps, VI2HI(t) represents the current set of filter taps, $(HI_{OUT}^2+HQ_{OUT}^2)$ represents an error term, $HI_{OUT}$ is the current decoupled output, $VI_{IN}$ is the current input to the module, and μ is a scaling or damping factor. The error term, the de-coupled output, and the scaling factor for the VI-to-HI module 1115 in equation (3) are the same as in equations (1) and (2).

In a fourth example, for the VQ-to-HI module 1120 of the H-pole FIR filter 1015-*a*, a next or updated set of filter taps may generally be determined by the following expression:

$$VQ2HI(t+1)=VQ2HI(t)+f(HI_{OUT}^2+HQ_{OUT}^2)\times\text{sign}(HI_{OUT})\times VQ_{IN}\times\mu, \quad (4)$$

where VQ2HI(t+1) represents the updated set of filter taps, VQ2HI(t) represents the current set of filter taps, $(HI_{OUT}^2+HQ_{OUT}^2)$ represents an error term, $HI_{OUT}$ is the current decoupled output, $VI_{IN}$ is the current input to the module, and μ is a scaling or damping factor. The error term, the de-coupled output, and the scaling factor for the VQ-to-HI module 1120 in equation (4) are the same as in equations (1), (2), and (3).

A similar approach to the one described above with reference to the filter taps updates for the HI-to-HI module 1105, the HQ-to-HI module 1110, the VI-to-HI module 1115, and the VQ-to-HI module 1120 using equations (1), (2), (3), and (4), respectively, may be used to calculate the filter taps updates for the other modules in the H-pole FIR filter 1015-*a*. Moreover, a similar approach may also be used to calculate the filter taps updates for the various modules in the V-pole FIR filter 1030-*a*.

Figure 12A:
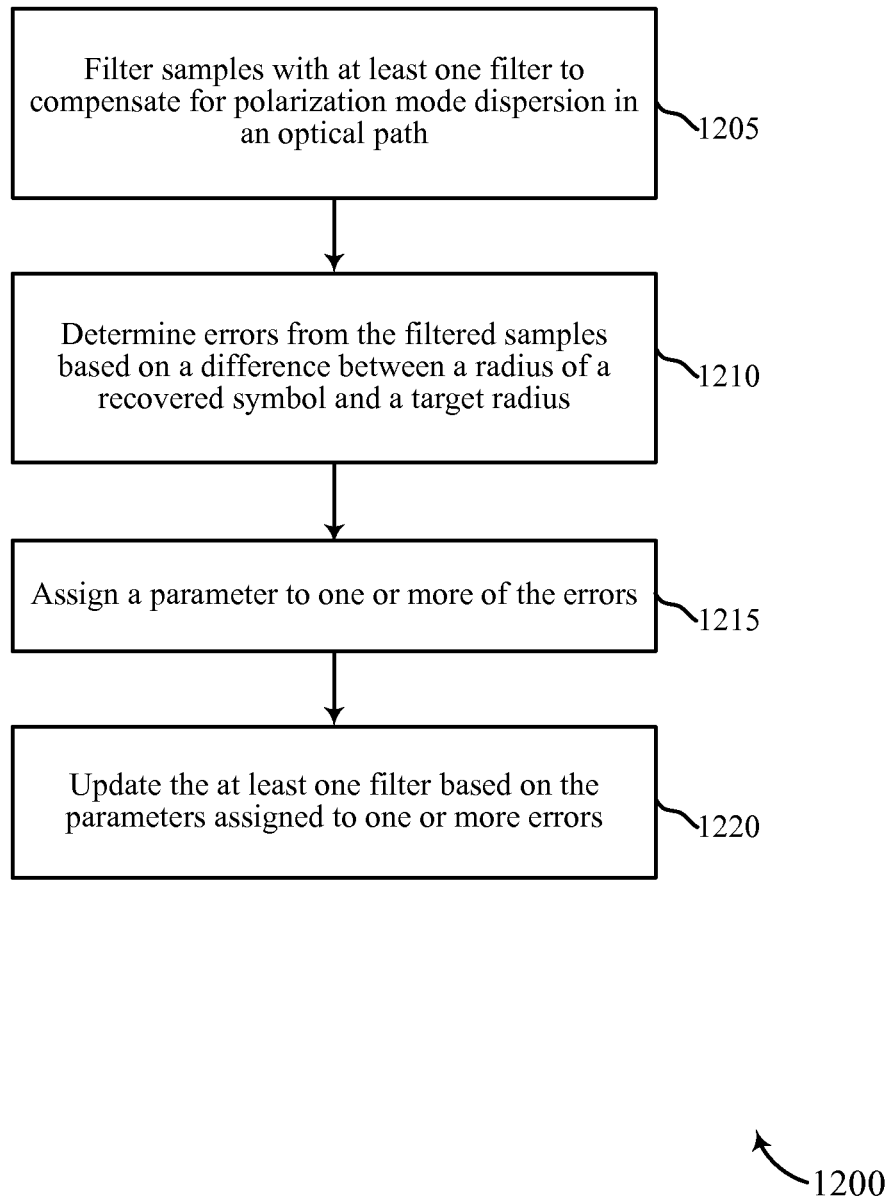
FIG. 12A is a flow chart of an example of a method for equalizing data from an optical signal according to various embodiments of the principles described herein.

FIG. 12A illustrates a flowchart diagram of an example method 1200 for equalizing data from an optical signal. The method 1200 may be performed using, for example, the digital demodulation and decoding units 125 and 125-*a* of FIG. 1 and FIG. 5, respectively; the demodulator modules 510, 510-*a*, and 510-*b* of FIG. 5, FIG. 6, and FIG. 7, respectively; the dual pole adaptive equalizers 635, 635-*a*, and 635-*b* of FIG. 6, FIG. 7, and FIG. 9, respectively; and/or the modem of FIG. 7.

At block 1205, samples are filtered with at least one filter to compensate for polarization mode dispersion in an optical path. The at least one filter may include at least one FIR filter. Examples of filters that may be used for polarization mode dispersion compensation include, but need not be limited to, the H-pole FIR filters 1015 and 1015-*a*, and the V-pole FIR filters 1030 and 1030-*a*. At block 1210, errors may be determined from the filtered samples based on a difference between a radius of a recovered symbol and a target radius. At block 1215, a parameter is assigned to one or more of the errors. The parameter may be assigned based on whether an error is within a guardband, for example. At block 1220, the at least one filter is updated based on the parameters assigned to the one or more errors. When the at least one filter includes an FIR filter, the updating of the at least one filter includes updating a particular set of taps of the FIR filter based on the parameter assigned to one of the one or more errors. Examples of error determination and identification, parameter assignment, and filter update are illustrated above at least with reference to FIG. 8B, FIG. 8C, FIG. 8D, FIG. 8E, FIG. 8F, FIG. 10A, FIG. 10B, FIG. 11A, and FIG. 11B. Moreover, examples of error determination and identification, parameter assignment, and filter update are illustrated above with reference to equations (1), (2), (3), and (4).

In some embodiments of the method 1200, the parameter assigned to one of the one or more errors indicates a positive sign, a negative sign, or a zero based on at least one threshold value. In some embodiments, a parameter is assigned to one of the one or more errors to indicate a positive sign when the error is smaller than a first threshold value or a negative sign when the error is greater than a second threshold value larger than the first threshold value. In some embodiments, a parameter is assigned to one of the one or more errors to indicate a zero when the error is greater than a first threshold and smaller than a second threshold value larger than the first threshold value. For quaternary or higher-order modulation schemes (e.g., 16-QAM), parameter assignment may be based on the location of the error relative to two or more threshold values. Examples of using multiple threshold values for higher-order modulation scheme are illustrated above with reference to FIG. 8F. In some embodiments, an output is generated from the filtered samples, where the output corresponds to a particular set of taps of the at least one filter. A parameter may be assigned to the output that is different from the parameter assigned to one of the errors and the particular set of taps may be updated based on the parameter assigned to the output.

Figure 12B:
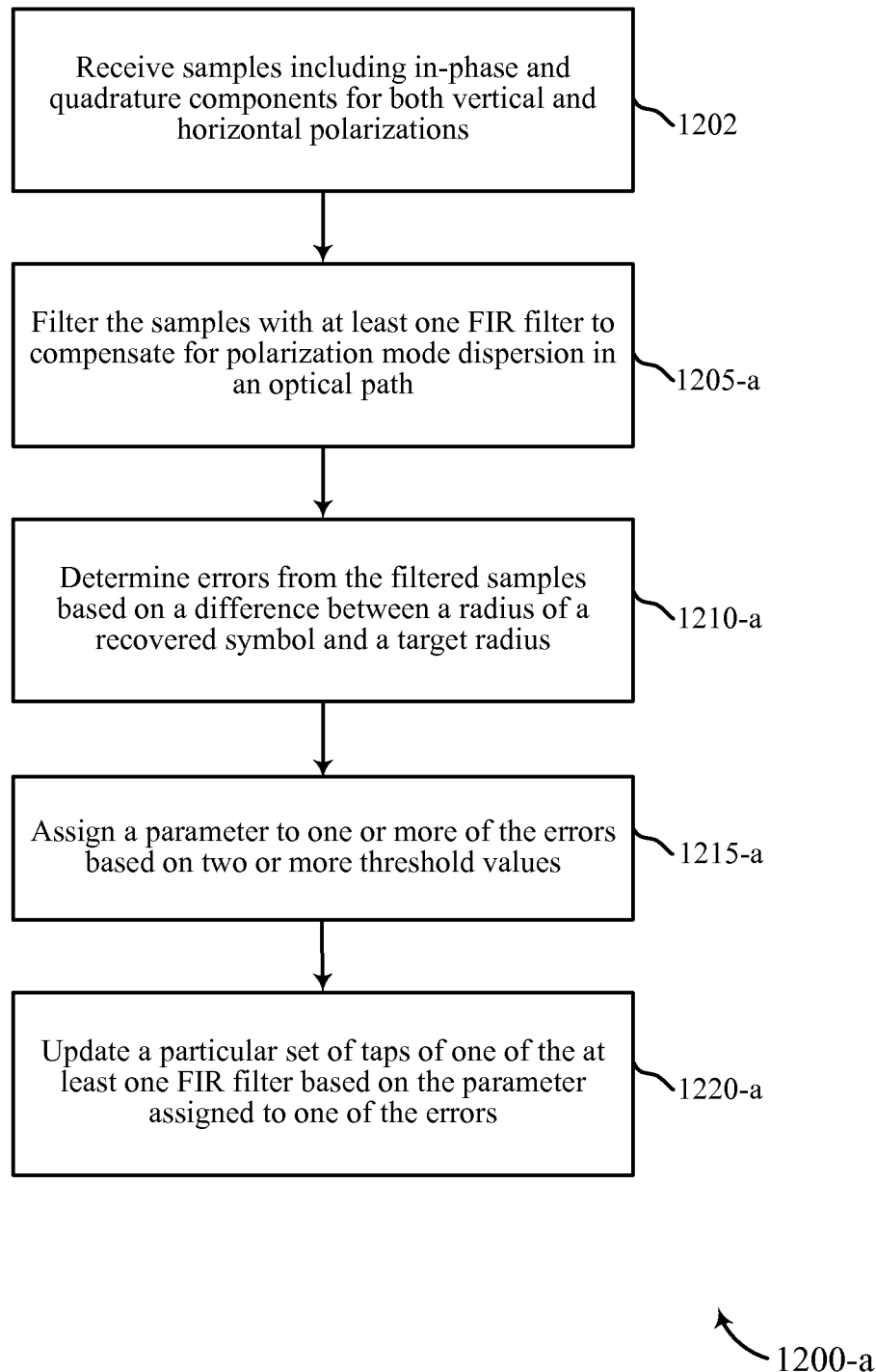
FIG. 12B is a flow chart of another example of a method for equalizing data from an optical signal occurrence according to various embodiments of the principles described herein.

FIG. 12B illustrates a flowchart diagram of an example method 1200-*a* for equalizing data from an optical signal. The method 1200-*a*, like the method 1200 above, may be performed using, for example, the digital demodulation and decoding units 125 and 125-*a* of FIG. 1 and FIG. 5, respectively; the demodulator modules 510, 510-*a*, and 510-*b* of FIG. 5, FIG. 6, and FIG. 7, respectively; the dual pole adaptive equalizers 635, 635-*a*, and 635-*b* of FIG. 6, FIG. 7, and FIG. 9, respectively; and/or the modem of FIG. 7.

At block 1202, samples including in-phase and quadrature components for both vertical and horizontal polarizations are received. The samples may be received from HI, HQ, VI, and VQ streams that are a combination of the transmitted HI, HQ, VI, and VQ streams as a result of optical phenomena during transmission (e.g., PMD). At block 1205-*a*, samples are filtered with at least one FIR filter to compensate for polarization mode dispersion in an optical path. At block 1210-*a*, errors may be determined from the filtered samples based on a difference between a radius of a recovered symbol and a target radius.

At block 1215-*a*, a parameter is assigned to one or more of the errors based on two or more thresholds. Examples of parameter assignment using thresholds are illustrated above at least with reference to FIG. 8C, FIG. 8D, FIG. 8E, and FIG. 8F, and with reference to equations (1), (2), (3), and (4). At block 1220-*a*, a particular set of taps of one of the at least one FIR filters is updated based on the parameter assigned to one of the errors.

Figure 13:
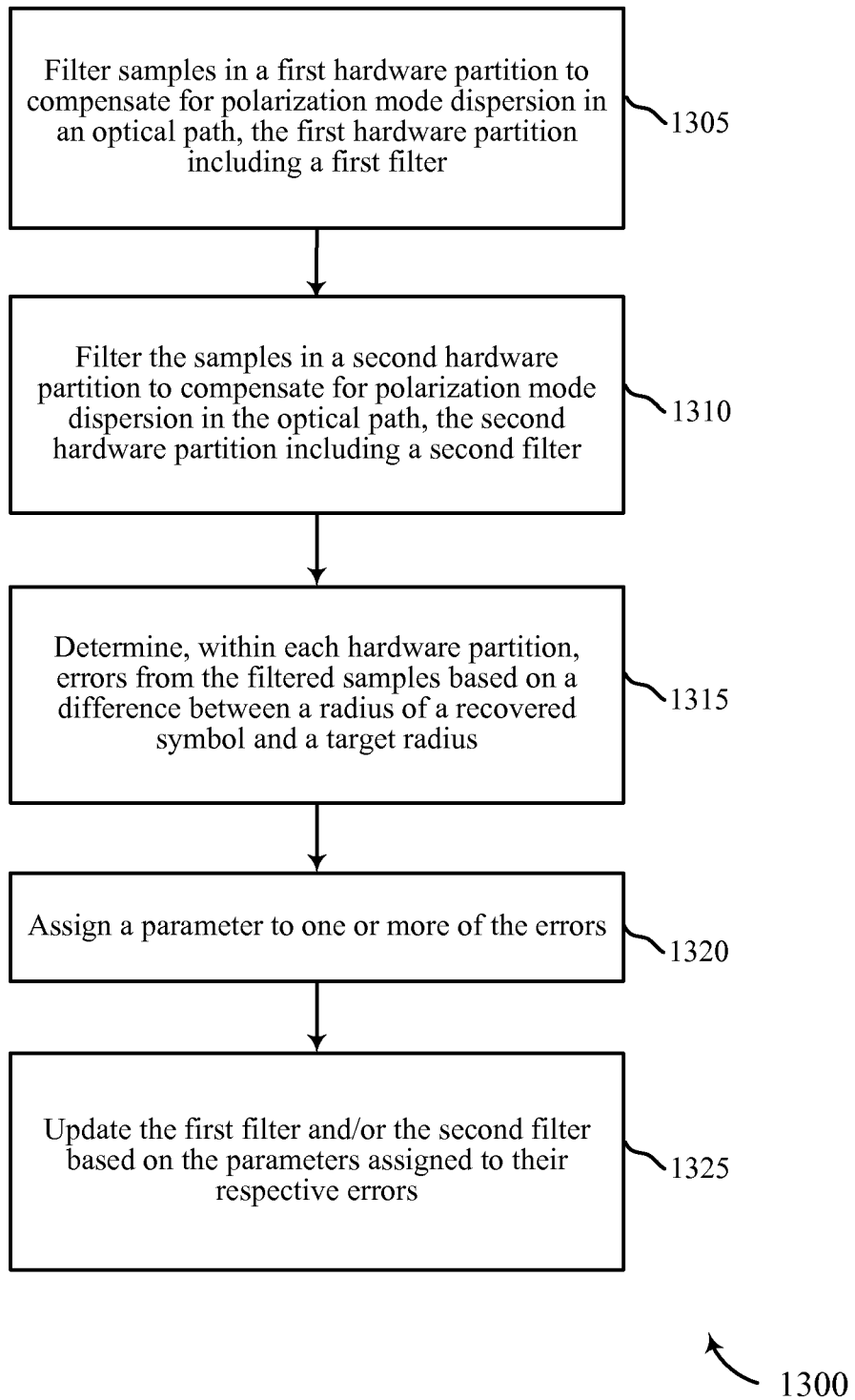
FIG. 13 is a flow chart of an example of a method for equalizing data from an optical signal using separate hardware partitions for each polarization according to various embodiments of the principles described herein.

FIG. 13 illustrates a flowchart diagram of an example method 1300 for equalizing data from an optical signal. The method 1300 may be performed using, for example, the digital demodulation and decoding units 125 and 125-*a* of FIG. 1 and FIG. 5, respectively; the demodulator modules 510, 510-*a*, and 510-*b* of FIG. 5, FIG. 6, and FIG. 7, respectively; the dual pole adaptive equalizers 635, 635-*a*, and 635-*b* of FIG. 6, FIG. 7, and FIG. 9, respectively; the H-pole equalizers 905 and 905-*a* of FIG. 9 and FIG. 10A, respectively; the V-pole equalizers 910 and 910-*a* of FIG. 9 and FIG. 10B, respectively; and/or the modem of FIG. 7.

At block 1305, samples are filtered in a first hardware partition to compensate for polarization mode dispersion in an optical path. The first hardware partition includes a first filter. At block 1310, the samples are in a second hardware partition to compensate for polarization mode dispersion in the optical path. The second hardware partition includes a second filter. At block 1315, within each hardware partition, determine errors from the filtered samples based on a difference between a radius of a recovered symbol and a target radius. At block 1320, each hardware partition assigns a parameter to one or more of their respective errors. At block 1325, the first hardware partition may update the first filter based on the parameters assigned to the errors corresponding to the first hardware partition, and/or the second hardware partition may update the second filter based on the parameters assigned to the errors corresponding to the second hardware partition.

In some embodiments, a system for equalizing data from an optical signal includes means for filtering samples with at least one filter to compensate for polarization mode dispersion in an optical path. The means may include, but need not be limited to, an FIR filter as illustrated in FIG. 10A, FIG. 10B, FIG. 11A, and/or FIG. 11B, for example. The system may also include means for determining errors from the filtered samples based on a difference between a radius of a recovered symbol and a target radius. The means may include, but need not be limited to, a filter update and control as illustrated in FIG. 10A and/or FIG. 10B, for example. The system may further include means for assigning a parameter to one or more of the errors. The parameter assigned to one of the errors may indicate a positive sign, a negative sign, or a zero based on at least one threshold value. The means may include, but need not be limited to, a filter update and control as illustrated in FIG. 10A and/or FIG. 10B, for example. The system may also include means for updating the at least one filter based on the parameters assigned to the one or more errors. The means may include, but need not be limited to, a filter update and control as illustrated in FIG. 10A and/or FIG. 10B, for example.

The system may also include means for updating a particular set of taps of the at least one FIR filter based on the parameter assigned to one of the errors. The means may include, but need not be limited to, a filter update and control as illustrated in FIG. 10A and/or FIG. 10B, for example. The system may further include means for generating an output from the filtered samples, the output corresponding to a particular set of taps of the at least one filter. The means may include, but need not be limited to, an FIR filter as illustrated in FIG. 10A, FIG. 10B, FIG. 11A, and/or FIG. 11B, for example. The system may also include means for assigning a parameter to the output different from the parameter assigned to the one or more errors. The means may include, but need not be limited to, a filter update and control as illustrated in FIG. 10A and/or FIG. 10B, for example. The system may also include means for updating that particular set of taps based on the parameter assigned to the output. The means may include, but need not be limited to, a filter update and control as illustrated in FIG. 10A and/or FIG. 10B, for example. Moreover, the system may include means for generating one or more output streams from the filtered samples, the filtered samples being on-time samples and the one or more output streams having a rate of one sample-per-symbol. The means may include, but need not be limited to, an FIR filter as illustrated in FIG. 10A, FIG. 10B, FIG. 11A, and/or FIG. 11B, for example.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with reference to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. A method for equalizing data communicated via an optical path, comprising:

receiving, by a receiver device, a sampled signal comprising horizontal in-phase/quadrature (I/Q) samples and vertical I/Q samples;

generating, by a horizontal polarization equalizer, filtered horizontal I/Q samples by:

filtering the horizontal I/Q samples and the vertical I/Q samples with a horizontal polarization filter to obtain the filtered horizontal I/Q samples;

determining first errors from the filtered horizontal I/Q samples based on differences between radii of recovered symbols of the filtered horizontal I/Q samples and a target radius;

assigning first parameters to one or more of the first errors; and updating the horizontal polarization filter based on the first parameters assigned to the one or more of the first errors; and generating, by a vertical polarization equalizer, filtered vertical I/Q samples by:

filtering the horizontal I/Q samples and the vertical I/Q samples with a vertical polarization filter to obtain the filtered vertical I/Q samples;

determining second errors from the filtered vertical I/Q samples based on differences between radii of recovered symbols of the filtered vertical I/Q samples and the target radius;

assigning second parameters to one or more of the second errors; and updating the vertical polarization filter based on the second parameters assigned to the one or more of the second errors, wherein the horizontal polarization equalizer comprises a first hardware partition of the receiver device and the vertical polarization equalizer comprises a second, different, hardware partition of the receiver device.

2. The method of claim 1, wherein the first and second parameters assigned to the one or more of the first and second errors indicate a positive sign, a negative sign, or a zero based on at least one threshold value.

3. The method of claim 1, wherein the horizontal and vertical polarization filters comprise at least one finite impulse response (FIR) filter.

4. The method of claim 3, further comprising:
updating a particular set of taps of the at least one FIR filter based on the first or second parameters assigned to the one or more of the first and second errors.

5. The method of claim 1, further comprising:
assigning to one of the one or more first and second errors, a parameter based on whether the one error is within a guardband.

6. The method of claim 1, further comprising:
assigning to one of the one or more first and second errors, a parameter indicating a positive sign when the one error is smaller than a first threshold value or a negative sign when the one error is greater than a second threshold value larger than the first threshold value.

7. The method of claim 1, further comprising:
assigning to one of the one or more first and second errors, a parameter indicating a zero when the one error is greater than a first threshold and smaller than a second threshold value larger than the first threshold value.

8. The method of claim 1, further comprising:
for quaternary or higher-order modulation schemes, assigning to one of the one or more of the first and second errors, a parameter based on the location of the one error relative to two or more threshold values.

9. The method of claim 1, further comprising:
generating horizontal and vertical output from the filtered horizontal and vertical I/Q samples, the horizontal and vertical output corresponding to particular sets of taps of the horizontal and vertical polarization filters;
assigning parameters to the horizontal and vertical output different from the first and second parameters; and
updating respective sets of taps of the horizontal and vertical polarization filters based on the parameters assigned to the horizontal and vertical output.

10. The method of claim 1, further comprising:
generating one or more horizontal and vertical output streams from the filtered horizontal and vertical I/Q samples, the filtered horizontal and vertical I/Q samples being on-time samples and the one or more horizontal and vertical output streams having a rate of one sample-per-symbol.

11. A receiver system for equalizing data from an optical signal, comprising:
means for receiving a sampled signal comprising horizontal in-phase/quadrature (I/Q) samples and vertical I/Q samples;
means for generating filtered horizontal I/Q samples with a horizontal polarization equalizer comprising:
means for filtering the horizontal I/Q samples and the vertical I/Q samples with a horizontal polarization filter to obtain the filtered horizontal I/Q samples;
means for determining first errors from the filtered horizontal I/Q samples based on differences between radii of recovered symbols of the filtered horizontal I/Q samples and a target radius;
means for assigning first parameters to one or more of the first errors; and
means for updating the horizontal polarization filter based on the first parameters assigned to the one or more of the first errors; and
means for generating filtered vertical I/Q samples with a vertical polarization equalizer comprising:
means for filtering the horizontal I/Q samples and the vertical I/Q samples with a vertical polarization filter to obtain the filtered vertical I/Q samples;
means for determining second errors from the filtered vertical I/Q samples based on differences between radii of recovered symbols of the filtered vertical I/Q samples and the target radius;
means for assigning second parameters to one or more of the second errors; and
means for updating the vertical polarization filter based on the second parameters assigned to the one or more of the second errors,
wherein the horizontal polarization equalizer comprises a first hardware partition of the receiver system and the vertical polarization equalizer comprises a second, different, hardware partition of the receiver system.

12. The receiver system of claim 11, wherein the first and second parameters assigned to one of the one or more of the first and second errors indicates a positive sign, a negative sign, or a zero based on at least one threshold value.

13. The receiver system of claim 11, wherein the horizontal and vertical polarization filters comprise at least one finite impulse response (FIR) filter.

14. The receiver system of claim 13, further comprising:
means for updating a particular set of taps of the at least one FIR filter based on one parameter assigned to one of the one or more of the first and second errors.

15. The receiver system of claim 13, further comprising:
means for generating horizontal and vertical output from the filtered horizontal and vertical I/Q samples, the horizontal and vertical output corresponding to particular sets of taps of the horizontal and vertical polarization filters;
means for assigning parameters to the horizontal and vertical output different from the first and second parameters; and
means for updating respective sets of taps of the horizontal and vertical polarization filters based on the parameters assigned to the horizontal and vertical output.

16. The receiver system of claim 11, further comprising:
means for generating one or more horizontal and vertical output streams from the filtered horizontal and vertical I/Q samples, the filtered horizontal and vertical I/Q samples being on-time samples and the one or more horizontal and vertical output streams having a rate of one sample-per-symbol.

17. A receiver device, comprising:
a horizontal polarization equalizer comprising:
a horizontal polarization filter module configured to filter horizontal in-phase/quadrature (I/Q) samples and vertical I/Q samples of a received sampled signal to obtain filtered horizontal I/Q samples; and
a first update module configured to determine first errors from the filtered horizontal I/Q samples based on differences between radii of recovered symbols of the filtered horizontal I/Q samples and a target radius, assign first parameters to one or more of the first errors, and update the at least one filter tap of the horizontal polarization filter module based on the first parameters assigned to the one or more first errors; and a vertical polarization equalizer comprising:
- a vertical polarization filter module configured to filter the horizontal I/Q samples and the vertical I/Q samples of the received sampled signal to obtain filtered vertical I/Q samples; and
- a second update module configured to determine second errors from the filtered vertical I/Q samples based on differences between radii of recovered symbols of the filtered vertical I/Q samples and the target radius, assign second parameters to one or more of the second errors, and update at least one filter tap of the vertical polarization filter module based on the second parameters assigned to the one or more second errors, wherein the horizontal polarization equalizer comprises a first hardware partition of the receiver device and the vertical polarization equalizer comprises a second, different, hardware partition of the receiver device.

18. The receiver device of claim 17, wherein the first and second parameters assigned to one of the one or more of the first and second errors indicates a positive sign, a negative sign, or a zero based on at least one threshold value.

19. The receiver device of claim 17, wherein the horizontal and vertical polarization filters comprise at least one finite impulse response (FIR) filter.

20. The receiver device of claim 19, wherein the first and second update modules are configured to update a particular set of taps of the at least one FIR filter based on one parameter assigned to one of the one or more of the first and second errors.

21. The receiver device of claim 17, wherein:
the horizontal and vertical filter modules are configured to generate horizontal and vertical output from the horizontal and vertical I/Q filtered samples, the horizontal and vertical output corresponding to particular sets of taps of the horizontal and vertical polarization filters, and the first and second update modules are configured to assign parameters to the horizontal and vertical output different from the first and second parameters, wherein the first and second update modules are configured to update respective sets of taps of the horizontal and vertical polarization filters based on the parameters assigned to the horizontal and vertical output.

22. The receiver device of claim 17, wherein the horizontal and vertical filter modules configured to generate one or more horizontal and vertical output streams from the filtered horizontal and vertical I/Q samples, the filtered horizontal and vertical I/Q samples being on-time samples and the one or more horizontal and vertical output streams having a rate of one sample-per-symbol.

* * * * *